(12) United States Patent
Lundberg et al.

(10) Patent No.: US 8,359,941 B2
(45) Date of Patent: Jan. 29, 2013

(54) HYDRAULIC CONTROL SYSTEMS FOR DUAL CLUTCH TRANSMISSIONS

(75) Inventors: Philip C. Lundberg, Keego Harbor, MI (US); Bret M. Olson, Whitelake, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 731 days.

(21) Appl. No.: 12/569,476

(22) Filed: Sep. 29, 2009

(65) Prior Publication Data

US 2011/0077122 A1 Mar. 31, 2011

(51) Int. Cl.
*F16H 3/38* (2006.01)
*B60W 10/02* (2006.01)
*B60W 10/10* (2012.01)
*B60W 10/00* (2006.01)
*F16D 67/00* (2006.01)

(52) U.S. Cl. ............... 74/340; 192/3.58; 477/79
(58) Field of Classification Search .............. 74/329, 74/335, 340, 473.11; 192/3.57, 3.58, 3.63; 477/70, 79, 180
See application file for complete search history.

(56) References Cited

U.S. PATENT DOCUMENTS

| | | | | |
|---|---|---|---|---|
| 6,568,515 B2 * | 5/2003 | Harries | | 192/3.58 |
| 6,658,951 B2 * | 12/2003 | Harries | | 74/336 R |
| 6,883,394 B2 * | 4/2005 | Koenig et al. | | 74/335 |
| 6,898,992 B2 * | 5/2005 | Koenig et al. | | 74/335 |
| 6,953,417 B2 * | 10/2005 | Koenig | | 477/181 |
| 7,127,961 B2 * | 10/2006 | Braford et al. | | 74/340 |
| 7,155,993 B2 * | 1/2007 | Koenig et al. | | 74/331 |
| 7,300,375 B2 * | 11/2007 | Petrzik | | 475/119 |
| 7,395,908 B2 * | 7/2008 | Hegerath et al. | | 192/3.58 |
| 7,401,689 B2 * | 7/2008 | Hegerath et al. | | 192/3.58 |
| 7,410,438 B2 * | 8/2008 | Moehlmann et al. | | 475/116 |
| 7,464,618 B2 * | 12/2008 | Mohlmann et al. | | 74/346 |
| 7,752,935 B2 * | 7/2010 | Vernacchia et al. | | 74/335 |
| 7,823,473 B2 * | 11/2010 | Uberti et al. | | 74/335 |
| 7,938,037 B2 * | 5/2011 | John et al. | | 74/335 |
| 8,206,265 B2 * | 6/2012 | Maten et al. | | 477/130 |
| 8,216,110 B2 * | 7/2012 | Katakura et al. | | 477/79 |
| 8,225,687 B2 * | 7/2012 | Lundberg et al. | | 74/330 |
| 2009/0151495 A1 * | 6/2009 | Garabello et al. | | 74/473.11 |
| 2010/0096232 A1 * | 4/2010 | Buchanan et al. | | 192/3.61 |
| 2011/0056315 A1 * | 3/2011 | Lundberg et al. | | 74/473.11 |

FOREIGN PATENT DOCUMENTS

DE 10134115 A1 1/2003

\* cited by examiner

*Primary Examiner* — Troy Chambers
*Assistant Examiner* — Michael Gonzalez

(57) ABSTRACT

The present invention comprehends a plurality of embodiments of a hydraulic control system for various configurations of dual clutch transmissions. The hydraulic control systems all include a regulated source of pressurized hydraulic fluid including an electric pump, a filter and an accumulator, a pair of pressure control valves and a branching hydraulic circuit including pressure or flow control valves, spool or logic valves and two position valves which collectively supply and exhaust hydraulic fluid from a plurality of shift actuators. The actuators are connected to shift rails which include shift forks and are slidable to engage synchronizers and positive clutches associated with the various gear ratios.

12 Claims, 14 Drawing Sheets

HYDRAULIC CONTROL SYSTEMS FOR DUAL CLUTCH TRANSMISSIONS

FIELD

The present disclosure relates to hydraulic control systems and more particularly to hydraulic control systems and their components for dual clutch transmissions.

BACKGROUND

The statements in this section merely provide background information related to the present disclosure and may or may not constitute prior art.

In automotive transmission art, the dual clutch transmission (DCT) is a relatively new concept. A typical dual clutch transmission configuration includes a pair of mutually exclusively operating input clutches which drive a pair of input shafts. The input shafts may be disposed on opposite sides of an output shaft or may be disposed concentrically between spaced-apart output shafts. One of each of a plurality of pairs of constantly meshing gears which provide the various forward and reverse gear ratios is freely rotatably disposed on one of the shafts and the other of each pair of gears is coupled to one of the other shafts. A plurality of synchronizer clutches selectively couple the freely rotatable gears to the associated shaft to achieve forward and reverse gear ratios. After the synchronizer clutch is engaged, the input clutch associated with the input shaft having the engaged synchronizer clutch is applied to transmit power through the transmission. Reverse gear is similarly achieved except that it includes an additional (idler) gear to provide torque reversal.

Dual clutch transmissions are known for their sporty, performance oriented operating characteristics which mimic those of a conventional mechanical (manual) transmission. They also typically exhibit good fuel economy due to their good gear mesh efficiency, ratio selection flexibility, reduced clutch losses and the lack of a torque converter.

There are, however, design considerations unique to dual clutch transmissions. For example, because of heat generated during clutch slip, the input clutches must be of relatively large size. Furthermore, such heat generation typically requires correspondingly larger and more complex cooling components capable of dissipating relatively large quantities of heat. Finally, because such transmissions typically have many sets of axially aligned, meshing gears, their overall length may limit their use to certain vehicle designs.

Control of the input clutches and selection and engagement of a particular gear by translation of a synchronizer and associated positive clutch is typically achieved by a hydraulic control system. Such a system, itself under the control of an electronic transmission control module (TCM), includes hydraulic valves and actuators which engage the synchronizers and gear clutches. Optimum operating efficiency and thus fuel efficiency and minimal heat generation can be achieved by designing such hydraulic control systems to exhibit low leakage and positive control characteristics. The present invention is so directed.

SUMMARY

The present invention comprehends a plurality of embodiments of a hydraulic control system for various configurations of dual clutch transmissions having two or three countershafts, a third, idler shaft and four or five shift rails and hydraulic actuators. The hydraulic control systems all include a regulated source of pressurized hydraulic fluid including an electric pump, a filter and an accumulator, a pair of pressure control valves and a branching hydraulic circuit including pressure or flow control valves, spool or logic valves and two position valves which collectively supply and exhaust hydraulic fluid from a plurality of shift actuators. The actuators are connected to shift rails which include shift forks and are slidable to engage synchronizers and positive clutches associated with the various gear ratios.

Several of the embodiments define two essentially independent control systems supplied with hydraulic fluid through two independently operating valves. The two independent control systems are associated with respective transmission countershafts and, generally speaking, one countershaft is associated with the even-numbered gears (second, fourth, etc.) and the other countershaft is associated with the odd-numbered gears (first, third, etc.). When the transmission is operating in a normal ascending or descending gear selection sequence, this configuration permits pre-staging or pre-selection of a gear associated with one countershaft while a gear associated with the other countershaft is engaged and transmitting torque. Furthermore, if a component or components associated with one countershaft fail, the other countershaft and the alternating (i.e., first, third, fifth) selection of gear ratios it provides will still be fully operational—a highly desirable failure mode.

The hydraulic control systems according to the present invention are less complex and expensive relative to competing systems, provide improved control through interconnected logic valves which reduce the likelihood of engaging a wrong or multiple gears and provide reduced energy consumption by allowing shut-down of portions of the control system during steady state operation. Certain embodiments of the control system utilize pairs of pressure or flow control valves to control pressure on both sides of shift actuator pistons which provides better control and improved shifts.

Thus it is an object of the present invention to provide a hydraulic control system for a dual clutch automatic transmission.

It is a further object of the present invention to provide a hydraulic control system for a dual clutch transmission having a plurality of spool or logic valves and hydraulic actuators.

It is a still further object of the present invention to provide a hydraulic control system for a dual clutch transmission having a plurality of two position solenoid valves, spool valves and hydraulic actuators.

It is a still further object of the present invention to provide a hydraulic control system for a dual clutch transmission having a plurality of flow or pressure control valves, two position solenoid valves, logic or spool valves and hydraulic actuators.

It is a still further object of the present invention to provide a hydraulic control system for a dual clutch transmission comprising two essentially independent hydraulic systems, each associated with a respective transmission countershaft.

It is a still further object of the present invention to provide a hydraulic control system for a dual clutch transmission having a pair of input clutches associated with a pair of concentric input shafts and a pair of countershafts.

Further objects, advantages and areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
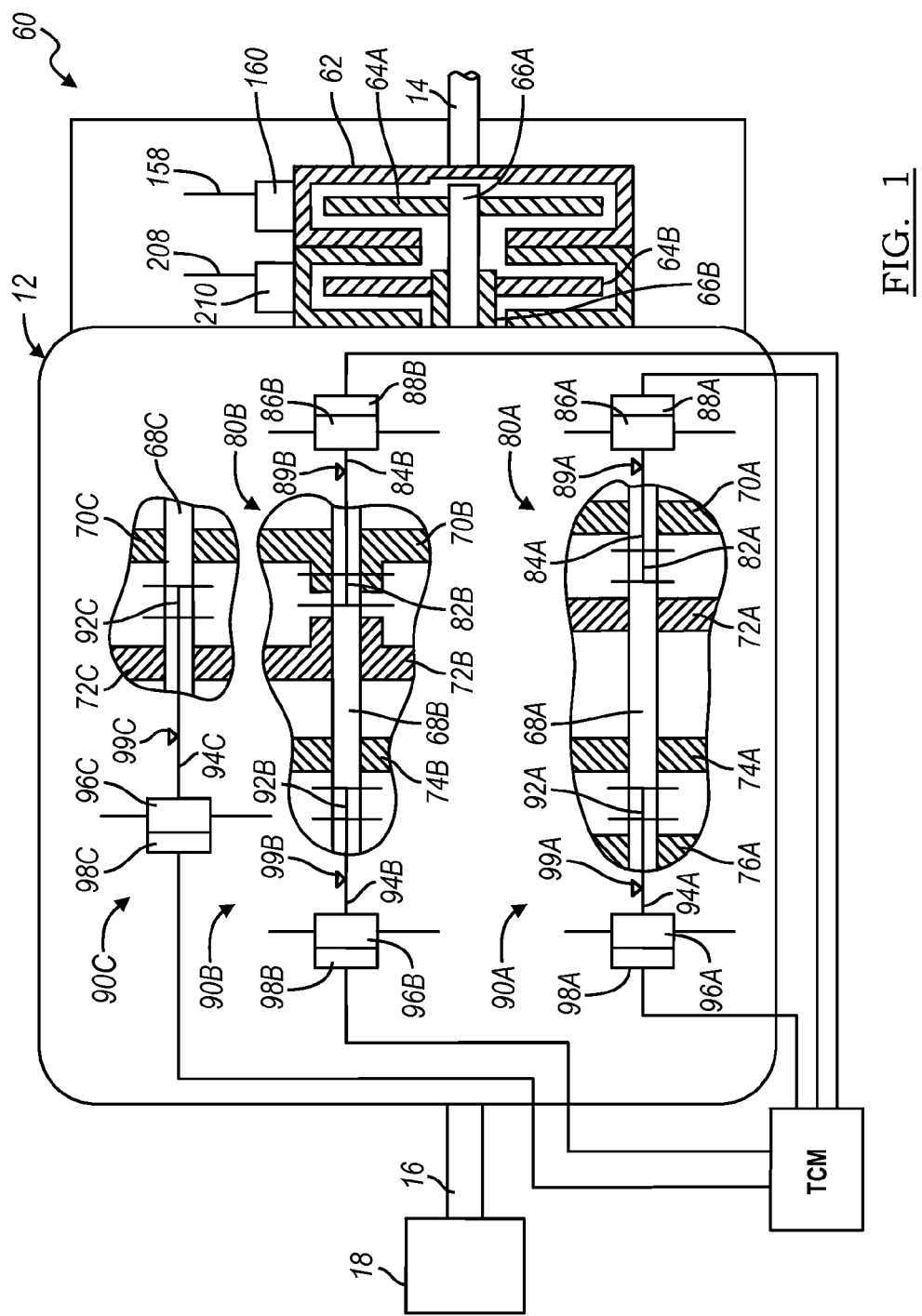
FIG. 1 is a pictorial view of an exemplary dual clutch automatic transmission with portions broken away incorporating a hydraulic control system according to the present invention having five shift actuator assemblies.

With reference to FIG. 1, an exemplary dual clutch automatic transmission incorporating the present invention is illustrated and generally designated by the reference number 60. The dual clutch transmission 60 includes a typically cast, metal housing 12 which encloses and protects the various components of the transmission 60. The housing 12 includes a variety of apertures, passageways, shoulders and flanges (not illustrated) which position and support the components of the transmission 60. The transmission 60 includes an input shaft 14 which receives motive power from a prime mover (not illustrated) such as an internal combustion gas or Diesel engine or a hybrid or electric power plant and a single or double output shaft 16 which drives a final drive assembly 18 which may include a propshaft, a differential and drive axles. The input shaft 14 is coupled to and drives a clutch housing 62. The clutch housing 62, in turn, drives a pair of concentrically disposed dry input clutches, a first input clutch 64A and a second input clutch 64B which are mutually exclusively engaged to provide drive torque to a respective pair of concentric input members, a first or inner input shaft 66A and a second or outer hollow input shaft or quill 66B.

Secured to and rotating with each of the input members 66A and 66B are a plurality of helical or spur gears (not illustrated) which are in constant mesh with helical or spur gears which are freely rotatably disposed on a first layshaft or countershaft 68A and a parallel, second layshaft or countershaft 68B. Adjacent and parallel to the second countershaft is a third layshaft or countershaft 68C. A first drive gear meshes with a first driven gear 70A on the first countershaft 68A. A second drive gear meshes with a second driven gear 72A on the first countershaft 68A. A third drive gear meshes with a third driven gear 74A on the first countershaft 68A. A fourth drive gear meshes with a fourth driven gear 76A on the first countershaft 68A. A fifth driven gear 70B on the second countershaft 68B meshes with a fifth drive gear 70C on the third countershaft 68C. The second drive gear also meshes with a sixth driven gear 72B on the second countershaft 68B which meshes with a seventh driven gear 72C on the third countershaft 68C. An eighth drive gear meshes with an eighth driven gear 74B on the second countershaft 68B.

Disposed either adjacent certain single gears or between adjacent pairs of gears on the countershafts 68A, 68B and 68C are synchronizer clutch assemblies. Each synchronizer clutch assembly, in accordance with conventional practice, includes a synchronizer assembly which, when activated, synchronizes the speed of a gear to that of the associated countershaft and a positive clutch, such as a dog or face clutch, which positively connects the gear to the shaft. Thus, between the driven gears 70A and 72A on the first countershaft 68A is a first shift actuator and synchronizer clutch assembly 80A having a double, i.e., back-to-back, first synchronizer clutch 82A which selectively and exclusively synchronizes and engages one of the gears 70A and 72A to the first countershaft 68A. The first synchronizer clutch 82A is bi-directionally translated by a first shift rail and fork assembly 84A which, in turn, is translated by a first shift actuator assembly 86A. The real time position of the first synchronizer clutch 82A and the first shift rail and fork assembly 84A is sensed by a first linear position sensor 88A which preferably provides a continuous, i.e., proportional, output signal to a transmission control module TCM indicating the position of the first synchronizer clutch 82A.

Between the fifth driven gear 70B and the sixth driven gear 72B on the second countershaft 68B is a second shift actuator and synchronizer clutch assembly 80B having a single synchronizer clutch 82B which synchronizes and couples the driven gear 72B to the second countershaft 68. The second synchronizer clutch 82B is bi-directionally translated by a second shift rail and fork assembly 84B which, in turn, is translated by a second shift actuator assembly 86B. The real time position of the second synchronizer clutch 82B and the second shift rail and fork assembly 84B is sensed by a second linear position sensor 88B which preferably provides a continuous, i.e., proportional, output signal to the transmission control module TCM indicating the position of the second synchronizer clutch 82B.

Between the driven gears 74A and 76A on the first countershaft 68A is a third shift actuator and synchronizer clutch assembly 90A having a double, i.e., back-to-back, third synchronizer clutch 92A which selectively and exclusively synchronizes and engages one of the gears 74A and 76A to the first countershaft 68A. The third synchronizer clutch 92A is bi-directionally translated by a third shift rail and fork assembly 94A which, in turn, is translated by a third shift actuator assembly 96A. The real time position of the third synchronizer clutch 92A and the third shift rail and fork assembly 94A is sensed by a third linear position sensor 98A which preferably provides a continuous, i.e., proportional, output signal to the transmission control module TCM indicating the position of the third synchronizer clutch 92A.

Adjacent the eighth driven gear 74B on the second countershaft 68B is a fourth shift actuator and synchronizer clutch assembly 90B having a single synchronizer clutch 92B which synchronizes and couples the eighth driven gear 74B to the second countershaft 68B. The fourth synchronizer clutch 92B is bi-directionally translated by a fourth shift rail and fork assembly 94B which, in turn, is translated by a fourth shift actuator assembly 96B. The real time position of the fourth synchronizer clutch 92B and the fourth shift rail and fork assembly 94B is sensed by a fourth linear position sensor 98B which preferably provides a continuous, i.e., proportional, output signal to the transmission control module TCM indicating the position of the fourth synchronizer clutch 92B.

Finally, between the fifth drive gear 70C and the seventh driven gear 72C on the third countershaft 68C is a fifth shift actuator and synchronizer clutch assembly 90C having a double, i.e., back-to-back, synchronizer clutch 92C which selectively and exclusively synchronizes and engages the seventh driven gear 72C to the third countershaft 68C or couples the seventh driven gear 72C to the fifth drive gear 70C. The fifth synchronizer clutch 92C is bi-directionally translated by a fifth shift rail and fork assembly 94C which, in turn, is translated by a fifth shift actuator assembly 96C. The real time position of the fifth synchronizer clutch 92C and the fifth shift rail and fork assembly 94C is sensed by a fifth linear position sensor 98C which preferably provides a continuous, i.e., proportional, output signal to the transmission control module TCM indicating the position of the fifth synchronizer clutch 92C. It should be understood that the linear position sensors 88A, 88B, 98A 98B and 98C may by replaced with other sensors such as two or three position switches or open loop control with system characterization.

Additionally, a detent mechanism may be employed with each of the shift assemblies to assist obtaining and maintaining a gear or speed ratio once it is selected and assist obtaining and maintaining the synchronizer clutch in neutral, i.e., an unengaged position. Thus, a first detent assembly 89A may be operatively associated with the first shift actuator and synchronizer clutch assembly 80A. A second detent assembly 89B may be operatively associated with the second shift actuator and synchronizer clutch assembly 80B. A third detent assembly 99A may be operatively associated with the third shift actuator and synchronizer clutch assembly 90A. A fourth detent assembly 99B may be operatively associated with the fourth shift actuator and synchronizer clutch assembly 90B and a fifth detent assembly 99C may be operatively associated with the fifth shift actuator and synchronizer clutch assembly 90C.

It will be appreciated that the transmission 60 illustrated and described above is laid out with four forward gears on one countershaft and the remaining (three) forward gears and reverse on two other countershafts. It is thus capable of providing seven forward speeds and reverse. Similar configurations, all deemed to be within the scope of this invention may, for example, include six forward speeds (or gears) and one or two reverse speeds (or gears) or five forward speeds and one or two reverse speeds.

It should be understood that while the present invention is directed to hydraulic control systems for dual clutch transmissions, such systems typically include one or more microprocessors contained in a transmission control module TCM. The transmission control module TCM includes a plurality of inputs which receive data from, for example, the linear position sensors and speed sensors, memory, software and a plurality of outputs which control and modulate, for example, the positions of the clutches, shift rails and logic solenoid valves.

Figure 2A:
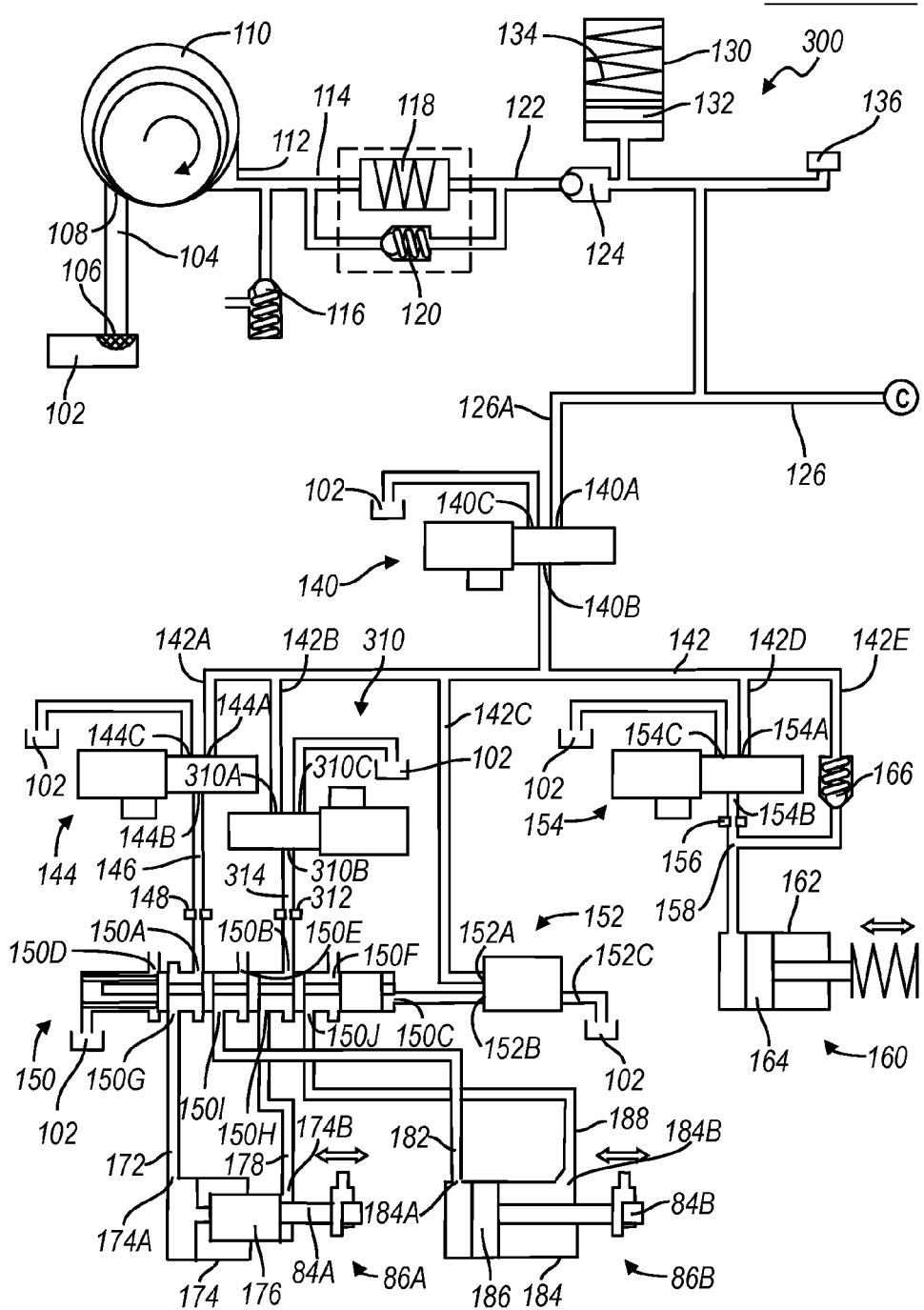
FIGS. 2A and 2B are schematic flow diagrams of a first embodiment of a hydraulic control system according to the present invention for a dual clutch automatic transmission.
Figure 2B:
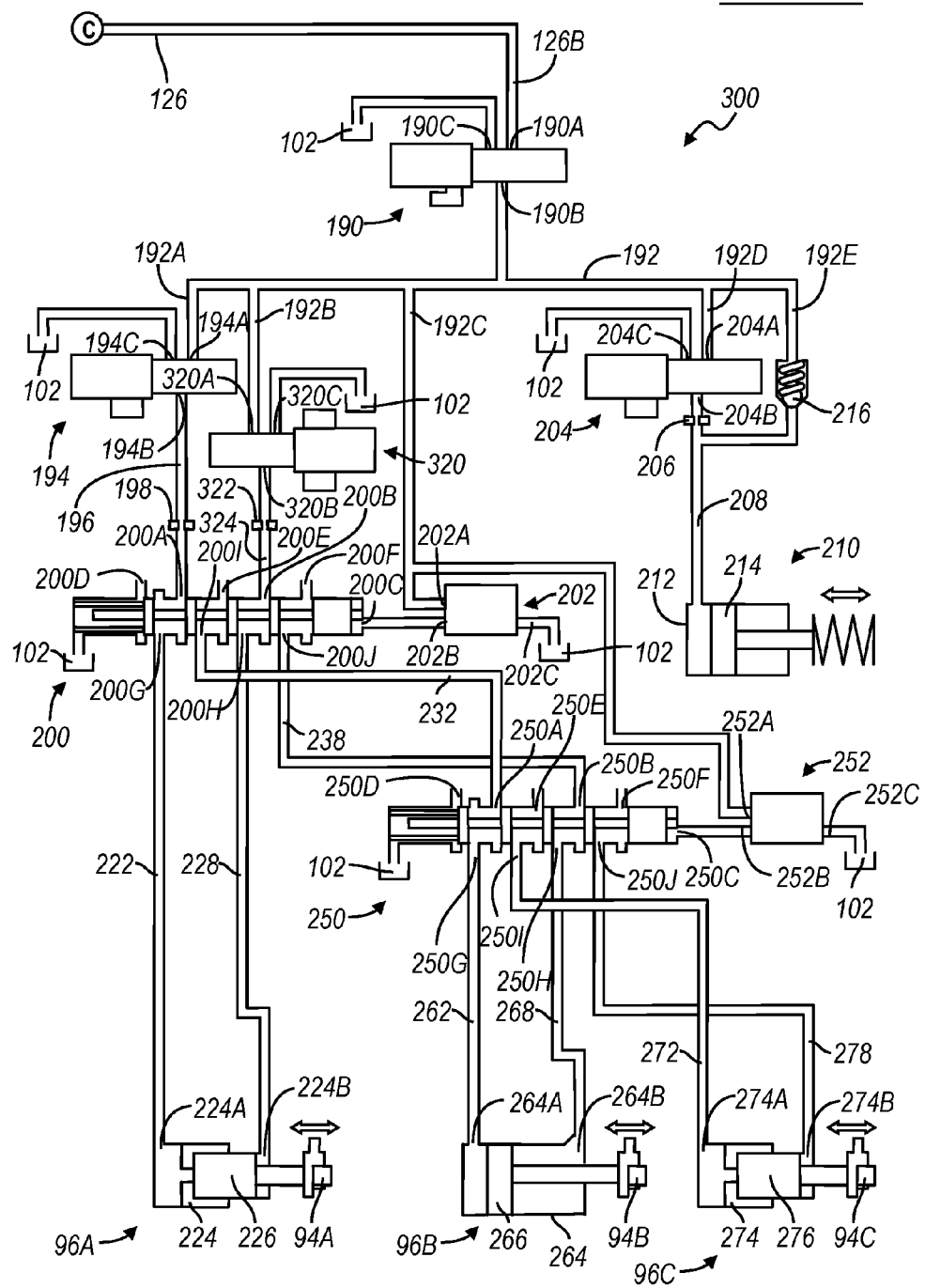

Referring now to FIGS. 1, 2A and 2B, a first embodiment of a hydraulic control system for the dual clutch automatic transmission 60 described above is illustrated and designated by the reference number 300. The hydraulic control system 300 includes a sump 102 to which hydraulic fluid returns and collects from various components and regions of the automatic transmission 60. A suction line 104 which may include a filter 106 communicates with the inlet port 108 of an engine driven or electric pump 110 which may be, for example, a gear pump, a vane pump, a gerotor pump or other positive displacement pump. An outlet port 112 of the pump 110 provides hydraulic fluid under pressure in a supply line 114 to a spring biased blow-off safety valve 116 and to a pressure side filter 118 which is disposed in parallel with a spring biased check valve 120. The safety valve 116 is set at a relatively high predetermined pressure and if the pressure in the supply line 114 exceeds this pressure, the safety valve 116 opens momentarily to relieve and reduce it.

If pressure ahead of the filter 118 rises to a predetermined differential pressure, indicating a partial blockage or flow restriction when cold of the filter 118 and the possibility that insufficient hydraulic fluid may be provided in an outlet line 122 to the remainder of the control system 300, the check valve 120 opens to allow hydraulic fluid to bypass the filter 118. A second check valve 124, in the outlet line 122, is configured to maintain hydraulic pressure in a main supply line 126 and to prevent backflow through the pump 110.

The main supply line 126 supplies pressurized hydraulic fluid to an accumulator 130 having a piston 132 and a biasing compression spring 134. The accumulator 130 may be one of many designs including a nitrogen filled piston accumulator. The accumulator 130 stores pressurized hydraulic fluid and supplies it to the main supply line 126, to a main or system pressure sensor 136 and to the other components of the hydraulic control system 300 thereby eliminating the need for either an engine driven or an electric pump 110 to run continuously. The main pressure sensor 136 reads the delivered hydraulic system pressure in real time and provides this data to the transmission control module TCM.

It should be appreciated that all the other embodiments of the hydraulic control system according to the present invention preferably include the hydraulic supply, filtration and control components just described. Accordingly, these components will be only briefly described in connection with the subsequent figures and embodiments, it being understood that the above description may be referenced to provide details.

In the embodiment of FIGS. 2A and 2B, the main supply line 126 branches or bifurcates into a first main supply line 126A and a second main supply line 126B. This initial bifurcation, before any gear or clutch selection or activation components, essentially splits the hydraulic control system 300 as well as the following second through sixth embodiments, into two separate control systems. This is advantageous from a control standpoint since if only one side of the transmission 60 is active, it is possible for only the clutch and gears on one countershaft to be selected at any given, without activation of the other side of the transmission. This is also desirable from a failure mode standpoint since failure of a component on one side of the transmission will affect only that side of the transmission and the control system, the clutch and gears on the other side of the transmission will, in all likelihood, still be available to provide limited operation and mobility.

The first main supply line 126A communicates with an inlet port 140A of a first electric pressure control solenoid valve 140 for one half of the transmission 60 associated with the first shaft 68A. The first pressure control solenoid valve 140 also includes an outlet port 140B that communicates with the inlet port 140A when the first control valve 140 is activated or energized and an exhaust port 140C that communicates with the outlet port 140B when the first control valve 140 is inactive or de-energized. The exhaust port 140C communicates with the sump 102. The outlet port 140B communicates with a first manifold 142 having five branches. A first branch 142A of the first manifold 142 communicates with an inlet port 144A of a first pressure or flow control solenoid valve 144.

When the pressure or flow control valve 144 is activated or energized, the inlet port 144A is in fluid communication with an outlet port 144B; when the pressure or flow control valve 144 is inactive or de-energized, the outlet port 144B is in fluid communication with an exhaust port 144C. The outlet port 144B is connected through a hydraulic line 146 having a flow restricting orifice 148 to a first inlet port 150A of a first spool or logic valve 150. It should be understood that the incorporation or omission of flow restricting orifices in all the hydraulic lines of the hydraulic control system 300 as well as the other embodiments is within the scope of this invention. The locations and sizes of the flow restricting orifices are based on operational, software and algorithm requirements.

In a second branch 142B of the first manifold 142, a third pressure or flow control solenoid valve 310 is disposed between the first manifold 142 and a second inlet port 150B of the first spool or logic valve 150. The third pressure or flow control solenoid valve 310 includes a first inlet port 310A communicating with the second branch 142B of the first manifold 142, an outlet port 310B which communicates with a flow restricting orifice 312 in a line 314 which connects to the second inlet port 150B of the first spool or logic valve 150 and an exhaust port 310C which communicates with the sump 102. The first logic valve 150 also includes three exhaust ports 150D, 150E and 150F interleaved with the first inlet port 150A and the second inlet port 150B. The three exhaust ports 150D, 150E and 150F communicate with the sump 102 although such connection is not illustrated for reasons of clarity.

A third branch 142C of the first manifold 142 connects to an inlet port 152A of a first two position (on-off) solenoid valve 152. An outlet port 152B of the first two position solenoid valve 152 communicates with a control port 150C at the end of the first logic valve 150. When the two position solenoid valve 152 is activated or energized, pressurized hydraulic fluid is supplied to the control port 150C of the first logic valve 150, translating the spool to the left as illustrated in FIG. 2A; when the two position solenoid valve 152 is inactive or de-energized, hydraulic fluid is exhausted from the first logic valve 150, through the outlet port 152B and out an exhaust port 152C to the sump 102, allowing the spool to translate to the right. A fourth branch 142D of the first manifold 142 communicates with an inlet port 154A of a first electric pressure or flow clutch control solenoid valve 154. The first clutch control solenoid valve 154 also includes an outlet port 154B and an exhaust port 154C which communicates with the sump 102.

When the clutch control solenoid valve 154 is activated or energized, pressurized hydraulic fluid is provided through the outlet port 154B, through a flow control orifice 156 in a line 158 to a first clutch piston and cylinder assembly 160. Slidably disposed within a cylinder 162 is a single acting piston 164 which translates to the right in FIG. 2A under hydraulic pressure to engage the first input clutch 64A, illustrated in FIG. 1.

When the first clutch control solenoid valve 154 is de-energized, the inlet port 154A is closed and hydraulic fluid from the cylinder 162 passes from the outlet port 154B to the exhaust port 154C and into the sump 102. A fifth branch 142E of the first manifold 142 communicates with an output of a first clutch pressure limit control valve 166. If pressure within the first clutch piston and cylinder assembly 160 exceeds a predetermined pressure determined by the pressure control solenoid 140, the first pressure limit control valve 166 opens to relieve and reduce the pressure.

Returning to the first spool or logic valve 150, it also includes a first outlet port 150G which communicates through a line 172 to a port 174A at one end of the first shift actuator assembly 86A which includes a cylinder or housing 174 and a piston 176 which is connected to the first shift rail and fork assembly 44A. In this embodiment, the first actuator assembly 86A and the first shift rail and fork assembly 84A are associated with an even numbered gear. A port 174B at the other end of the cylinder 174 of the first shift actuator assembly 86A communicates through a line 178 to a third outlet port 150H. A second outlet port 150I communicates through a line 182 to a port 184A at one end of the second shift actuator assembly 86B which includes a housing or cylinder 184 and a piston 186 which is connected to the second shift rail and fork assembly 84B. In this embodiment, the second shift actuator assembly 86B and the second shift rail and fork assembly 84B are also associated with even numbered gears. A port 184B at the other end of the cylinder 184 of the second shift actuator assembly 86B communicates through a line 188 to a fourth outlet port 150J.

Turning then to FIG. 2B, the second main supply line 126B communicates with an inlet port 190A of a second electric pressure control solenoid valve 190. The second pressure control solenoid valve 190 includes an outlet port 190B that communicates with the inlet port 190A when the second control valve 190 is energized and the exhaust port 190C that communicates with the outlet port 190B when the second control valve 190 is de-energized. The exhaust port 190C communicates with the sump 102. The outlet port 190B communicates with a second manifold 192 having five branches. A first branch 192A of the second manifold 192 communicates with an inlet port 194A of a second electric pressure or flow control solenoid valve 194. When the second pressure or flow control valve 194 is energized, the inlet port 194A is in fluid communication with an outlet port 194B; when the second pressure or flow control valve 194 is de-energized, the outlet port 194B is in fluid communication with an exhaust port 194C. The outlet port 194B is connected through a line 196 having a flow restricting orifice 198 to a first inlet port 200A of a second spool or logic valve 200.

A fourth pressure or flow control solenoid valve 320 is disposed in the second branch 192B of the second manifold 192. Specifically, an inlet port 320A of the fourth pressure or flow control solenoid valve 320 communicates with the second branch 192B of the second manifold 192. The fourth pressure or flow control solenoid valve 320 includes an outlet port 320B which communicates with a flow restricting orifice 322 in a line 324 which connects to the second inlet port 200B of the second spool or logic valve 200 and an exhaust port 320C which communicates with the sump 102.

The second spool or logic valve 200 also includes the three exhaust ports 200D, 200E and 200F interleaved with the inlets ports 200A and 200B which communicate with the sump 102 although, for reasons of clarity, such connections are not shown. A third branch 192C of the second manifold 192 connects to the inlet port of 202A of a second two position (on-off) solenoid valve 202. An outlet port 202B of the second two position solenoid valve 202 communicates with a control port 200C at the end of the second logic valve 200. When the second two position solenoid valve 202 is energized, pressurized hydraulic fluid is supplied to the control port 200C, translating the spool of the second logic valve 200 to the left. When the second two position solenoid valve 202 is de-energized, hydraulic fluid is exhausted from the second logic valve 200, through the outlet port 202B and out an exhaust port 202C to the sump 102, allowing the spool to translate to the right. A fourth branch 192D of the second manifold 192 communicates with an inlet port 204A of a second electric pressure or flow clutch control solenoid valve 204. The second clutch control solenoid valve 204 also includes an outlet port 204B and an exhaust port 204C which communicates with the sump 102.

When the second clutch control solenoid valve 204 is energized, pressurized hydraulic fluid is provided through an orifice 206 in a line 208 to a second clutch piston and cylinder assembly 210. Slidably disposed within a cylinder 212 is a single acting piston 214 which translates under hydraulic pressure to the right in FIG. 2B to engage the second input clutch 64B, illustrated in FIG. 1. When the second clutch control solenoid valve 204 is de-energized, the inlet port 204A is closed off and hydraulic fluid from the cylinder 212 passes from the outlet port 204B to the exhaust port 204C and into the sump 102. A fifth branch 192E of the second manifold 192 communicates with the output of a clutch pressure limit control valve 216. If pressure within the second clutch piston and cylinder assembly 210 exceeds a predetermined pressure supplied by the pressure control solenoid 190, the pressure limit control valve 216 opens to relieve and reduce the pressure.

The second spool or logic valve 200 also includes a first outlet port 200G which communicates through a hydraulic line 222 to a port 224A at one end of the third shift actuator assembly 96A which includes a cylinder or housing 224 and a piston 226 which is connected to the third shift rail and fork assembly 94A. In this embodiment, the third actuator assembly 96A and the third shift rail and fork assembly 94A may be associated with fifth and seventh gears. A port 224B at the other end of the cylinder 224 of the third shift actuator assembly 96A communicates through a line 228 to a third outlet port 200H.

A line 232 communicating with a second outlet port 200I of the second logic valve 200 is connected to a first inlet port 250A of a third spool or logic valve 250. A line 238 communicating with a fourth outlet port 200J of the second logic valve 200 is connected to a second inlet port 250B of the third spool or logic valve 250. Three exhaust ports 250D, 250E and 250F are interleaved with the first inlet port 250A and the second inlet port 250B. The three exhaust ports 250D, 250E and 250F communicate with the sump 102 although, for reasons of clarity, such connection is not illustrated. The third spool or logic valve 250 also includes a control port 250C at one end that communicates with an outlet port 252B of a third two position (on-off) solenoid valve 252. The third two position solenoid valve 252 includes an inlet port 252A which is in fluid communication with the third branch 192C of the second manifold 192 and an exhaust port 252C which communicates with the sump 102.

A first outlet port 250G communicates through a line 262 to a port 264A at one end of the fourth shift actuator assembly 96B which includes a cylinder or housing 264 and a piston 266 which is connected to the fourth shift rail and fork assembly 94B. In this embodiment, the fourth shift actuator assembly 96B is a two position type and engages only third gear. A port 264B at the other end of the cylinder 264 of the fourth actuator assembly 96B communicates through a line 268 to a third outlet port 250H.

When the third two position (on-off) solenoid valve 252 is not energized, hydraulic fluid flows through the first and third outlet ports 250G and 250H as described selecting third gear. When the third two position (on-off) solenoid valve 252 is energized, the spool of the third logic valve 250 translates to the left, as illustrated in FIG. 2B, and pressurized hydraulic fluid flows through the second outlet port 250I in a line 272 to a port 274A at one end of the fifth shift actuator assembly 96C which includes a cylinder or housing 274 and a piston 276 which is connected to the fifth shift rail and fork assembly 94C. A port 274B at the other end of the cylinder or housing 274 communicates with a fourth outlet port 250J through a line 278. The fifth shift actuator assembly 96C engages either first or reverse gear.

The first embodiment 300 of the hydraulic control system with the two pressure or flow control solenoid valves 310 and 320 provides improved control of hydraulic fluid flow and thus improved shift characteristics and well as reduced leakage in connection with the gear ratios selected or associated with the ports 150H and 150J of the first spool or logic valve 150 and the ports 200H and 200J of the second spool or logic valve 200. The pressure or flow control solenoid valves 310 and 320 also allow control of the hydraulic pressure and flow on both sides of the pistons of the shift actuators, thereby providing improved control and shift performance.

Figure 3A:
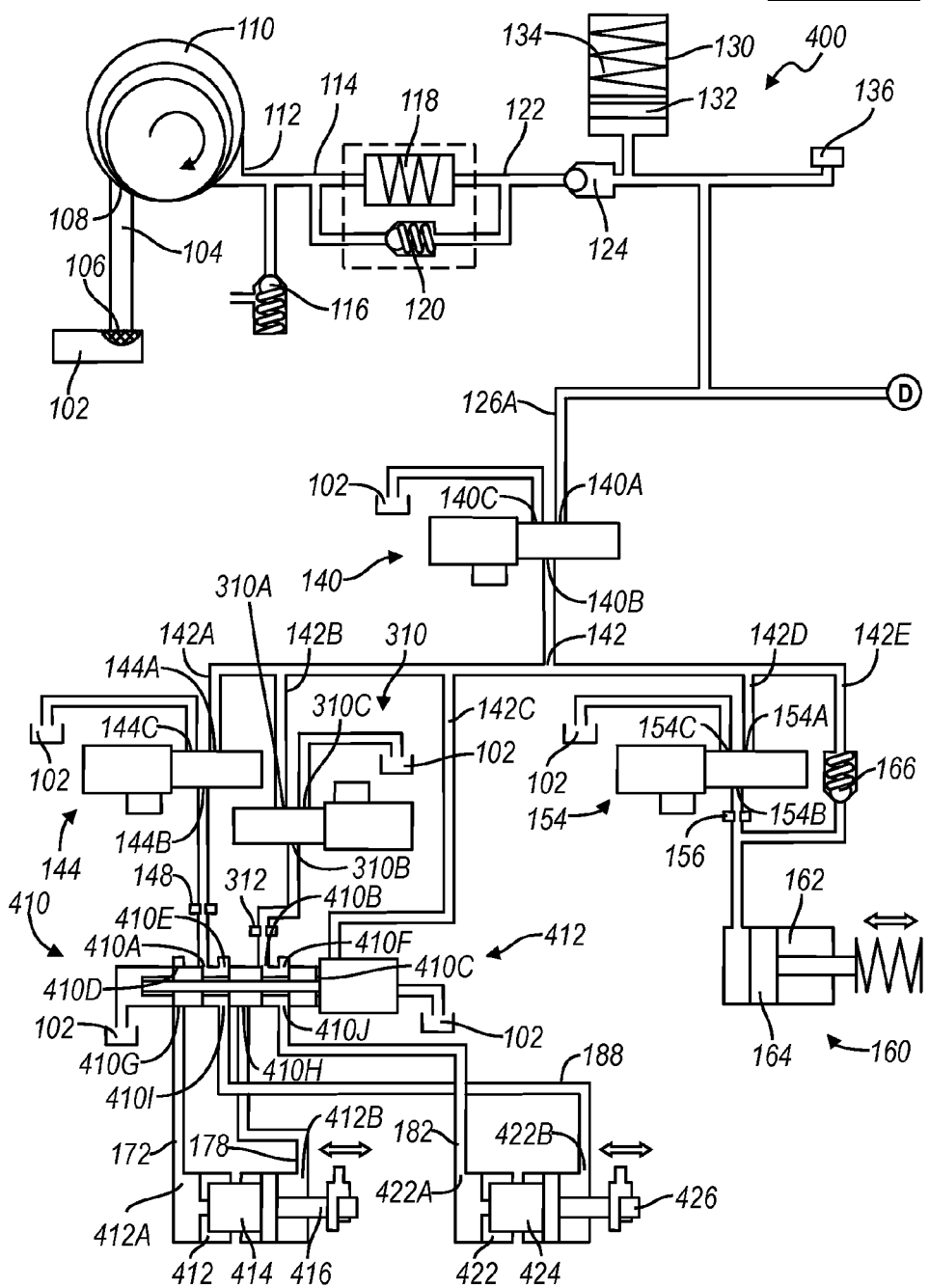
FIGS. 3A and 3B are schematic flow diagrams of a second embodiment of a hydraulic control system according to the present invention for a dual clutch automatic transmission.
Figure 3B:
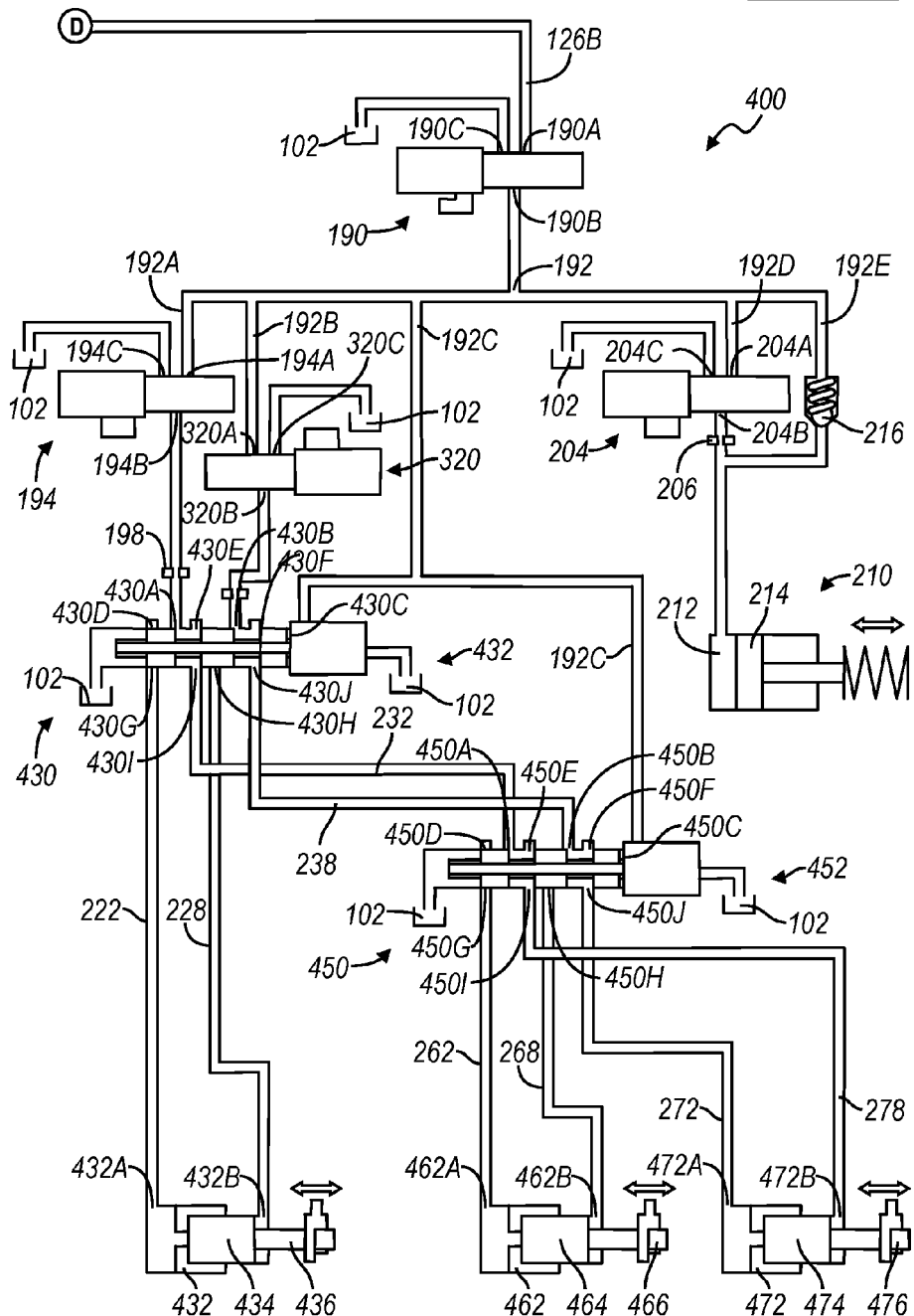

Referring now to FIGS. 1, 3A and 3B, a second embodiment of the hydraulic control system 400 is illustrated. The second embodiment 400 of the hydraulic control system, as stated above, includes the following components that are in the first embodiment: the electric or engine driven pump 110, the filters 106 and 118, the accumulator 130 and the other components of the hydraulic fluid supply and they will thus not be further described.

Furthermore, the majority of hydraulic components in the second embodiment 400 and their operation are identical to those in the first embodiment 300 with the exception of the construction of the three spool or logic valves 150, 200 and 250 and of the piston and cylinder assemblies which actuate the shift rails and synchronizer clutches.

Specifically, a direct acting first spool or logic valve 410 is an integrated assembly in which an electric operator or solenoid valve 412 is disposed at one end of the logic valve 410. Another option is to have an on-off solenoid valve at a first control port 410C of the first spool or logic valve 410 which is in selective fluid communication with the third branch 142C of the first manifold 142 through the two position (on-off) solenoid valve 412. For the on-off solenoid valve 412, its internal solenoid pendal or plunger will act directly on the control port 410C. A first inlet port 410A communicates through the orifice 148 with the outlet port 144B of the first electric pressure or flow control solenoid valve 144 and a second inlet port 410B communicates through the orifice 312 to the outlet port 310B of the third pressure or flow control solenoid valve 310. Three exhaust ports 410D, 410E and 410F are interleaved with the inlet port 410A and the inlet port 410B. A first outlet port 410G is connected to the line 172, a third outlet port 410H is connected to the line 178, a second outlet port 410I is connected to the line 188 and a fourth outlet port 410J is connected to the line 182.

The hydraulic line 172 is connected to a first port 412A of a first cylinder 412 which receives a first dual area (diameter) piston 414. The line 178 is connected to a second port 412B at the opposite end of the first cylinder 412. The first dual area piston 414 is utilized to provide three positive positions: left, center and right which are associated with engagement of a first gear or gear ratio, neutral and engagement of a second gear or gear ratio, respectively. Engaged gear positions are at distal ends of the actuator and are engaged by exhausting one side of the piston and pressurizing the opposite side. The three-area piston 414 translates in the opposite direction from the applied pressure. When the center, neutral position is desired, equal hydraulic pressure is applied to both faces of the dual area piston 414. The differential areas of the faces of the first piston 414 and stops within the bore of the first cylinder 412 result in a positive mechanical center (neutral) position for the first piston 414 and an associated first shift rail 416. The first shift rail 416 is coupled to components such as a shift fork and first synchronizer clutch assembly 82A which, for example, selects second or sixth gear. It should be noted that this and other dual area pistons can be replaced with a single or dual area pistons consisting of one moving piece with no piston sleeve.

Similarly, the hydraulic lines 182 and 188 communicate with a second actuator cylinder 422. The line 182 is connected to a first port 422A of the second cylinder 422 which receives a second dual area (diameter) piston 424. The line 188 is connected to a second port 422B at the opposite end of the second actuator cylinder 422. Although the piston 424 is configured for three position operation, in the fourth embodiment 400, the second piston 424 is coupled to a second shift rail 426, a second shift fork and the second synchronizer clutch assembly 82B which, for example, selects only fourth gear.

Similar differences reside in the hydraulic circuit associated with the other side of the transmission 60. That is, a second direct acting spool or logic valve 430 is an integrated assembly in which an electric operator or solenoid valve is disposed at one end of the logic valve 430. Another option is to have a two position (on-off) solenoid valve at the control port 430C which is in selective fluid communication with the third branch 192C of the second manifold 192 through the electrically operated solenoid valve or on-off solenoid valve 432. For the electrically operated solenoid valve, its internal pendal or plunger will act directly on the control port 430C. A first inlet port 430A communicates through the orifice 198 with the port 194B of the electric pressure or flow control solenoid valve 194 and a second inlet port 430B communicates through the orifice 332 to the outlet port 320B of the fourth pressure or flow control solenoid valve 320. A first outlet port 430G is connected to the line 222, a third outlet port 430H is connected to the line 228, a second outlet port 430I is connected to the line 232 and a fourth outlet port 430J is connected to the line 238. The line 222 is connected to a first port 432A of a third cylinder 432 which receives a third dual area (diameter) piston 434. The line 228 is connected to a second port 432B at the opposite end of the third cylinder 432. The third piston 434 bi-directionally translates a third shift rail 436 which is associated with a shift fork and the third synchronizer clutch 92A which selects, for example, fifth and seventh gears.

The hydraulic lines 232 and 238 communicate with a first inlet port 450A and a second inlet port 450B on a third integrated spool or logic valve 450. The third integrated spool or logic valve 450 is an integrated assembly in which an electrically operated solenoid valve or on-off solenoid valve 452 is disposed at one end of the logic valve 450. For the on-off solenoid option, the inlet port 450C is in selective fluid communication with the third branch 192C of the second manifold 192 through the electric operator or solenoid valve 452. A first outlet port 450G is connected to the line 262, a second outlet port 450I is connected to the line 278, a third outlet port 450H is connected to the line 268, and a fourth outlet port 450J is connected to the line 272.

The line 262 is connected to a first port 462A of a fourth cylinder 462 which receives a fourth dual area (diameter) piston 464. The line 268 is connected to a second port 462B at the opposite end of the fourth cylinder 462. Although the fourth piston 464 is capable of three position travel, in this configuration of the transmission 60, the fourth piston 464 bi-directionally translates a fourth shift rail 466 which is associated with a shift fork and the fourth synchronizer clutch 92B which selects, for example, only third gear. Finally, the line 272 is connected to a first port 472A of a fifth cylinder 472 which receives a fifth dual area (diameter) piston 474. The line 278 is connected to a second port 472B at the opposite end of the fifth cylinder 472. The fifth piston 474 translates a fifth shift rail 476, a fifth shift fork and the fifth synchronizer clutch assembly 92C to select, for example, first and reverse gears.

Figure 4A:
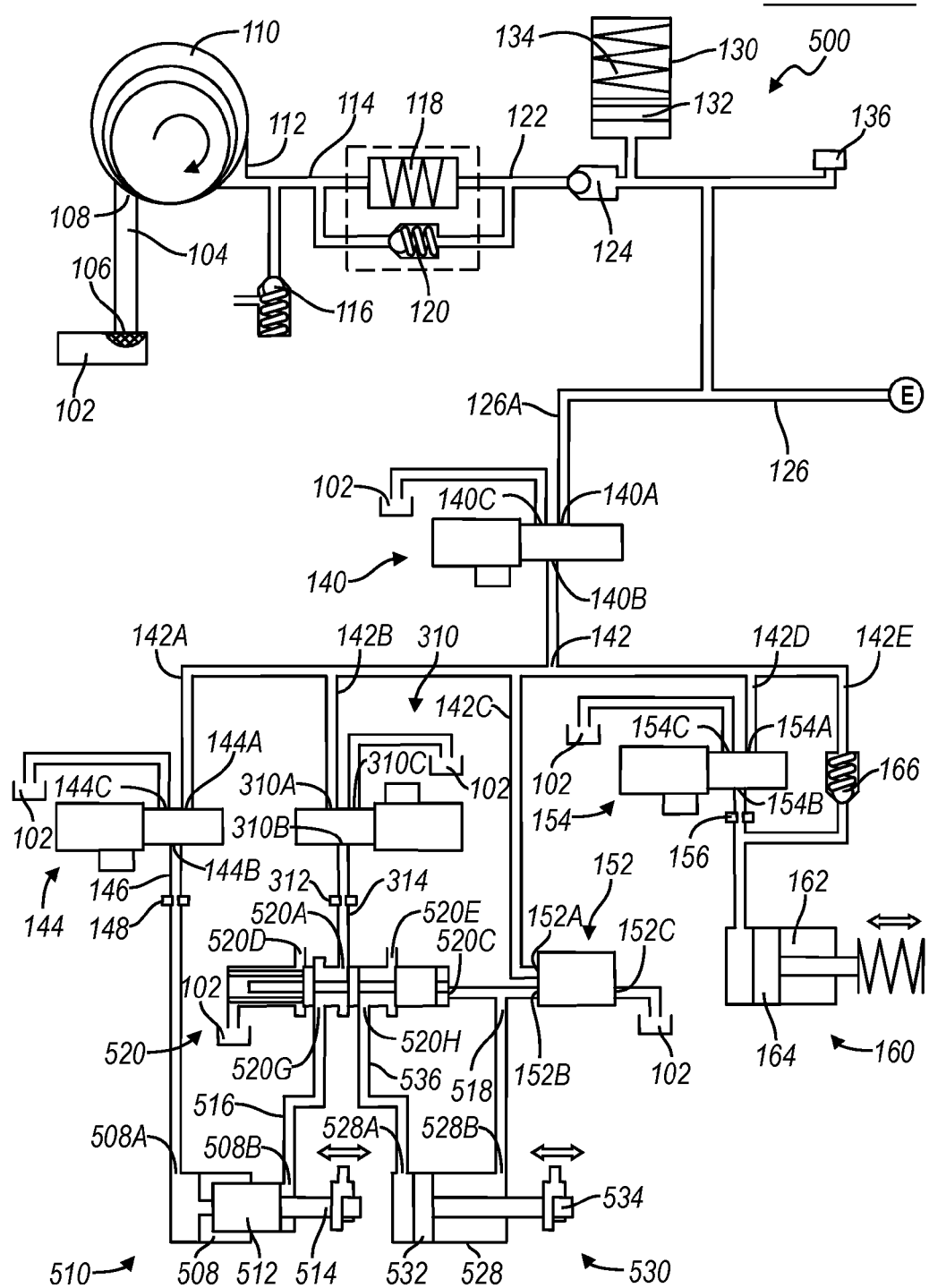
FIGS. 4A and 4B are schematic flow diagrams of a third embodiment of a hydraulic control system according to the present invention for a dual clutch automatic transmission.
Figure 4B:
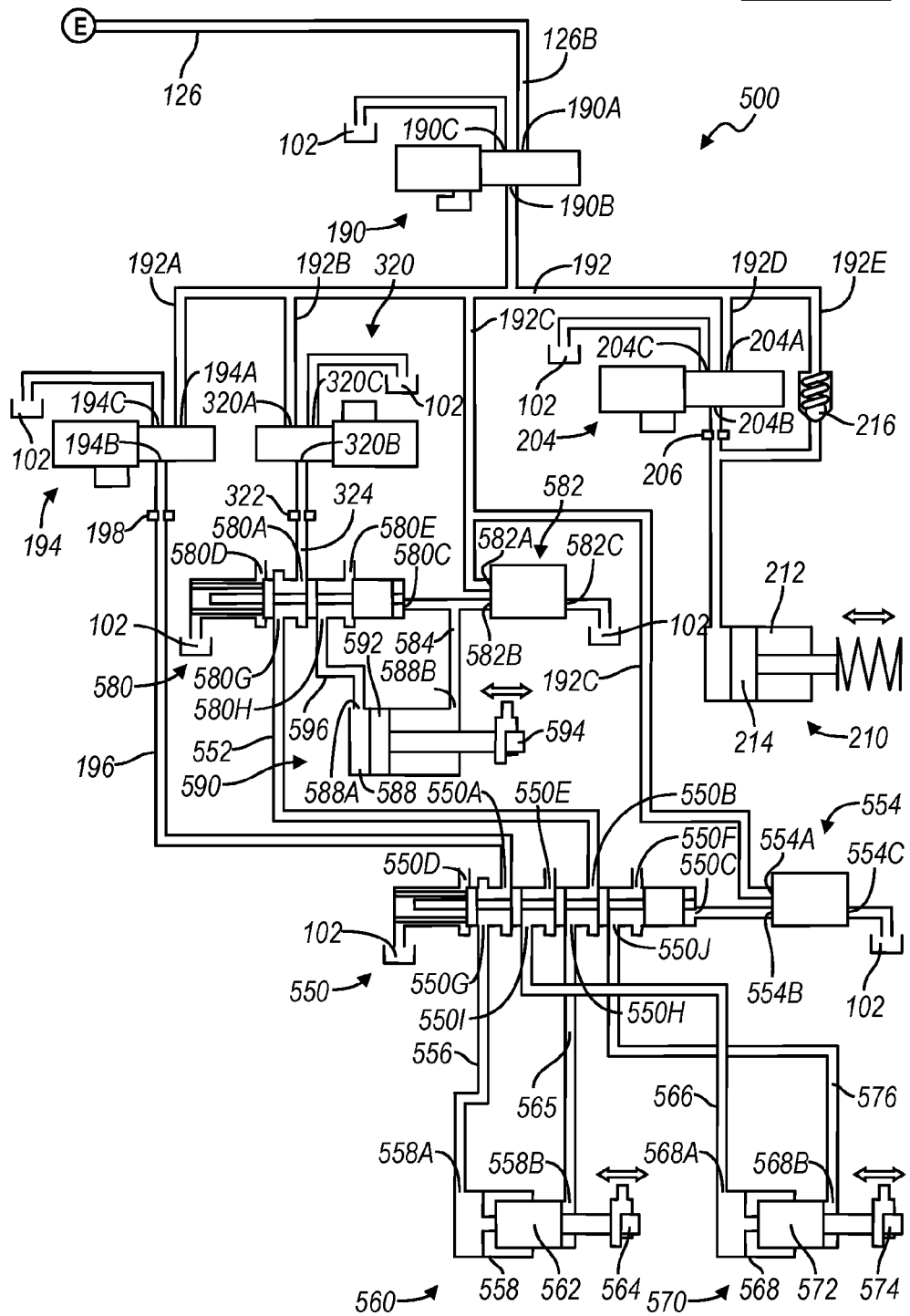

Referring now to FIGS. 1B, 4A and 4B, a third embodiment of a hydraulic control system according to the present invention is illustrated and generally designated by the reference number 500. The third embodiment 500 of the hydraulic control system, as stated above, includes, in common with the other embodiments, the electric or engine driven pump 110, the filters 106 and 118, the accumulator 130 and the other components of the hydraulic fluid supply and they will thus not be further described.

Additionally, the third embodiment 500 includes the main supply line 126 which bifurcates into the first supply line 126A and the second supply line 126B. The first supply line 126A communicates through the first pressure control solenoid valve 140 with the first manifold 142 and the second supply line 126B communicates through the second pressure control solenoid valve 190 with the second manifold 192. Furthermore, the components associated with activation of the first clutch 64A, such as the first electric pressure or flow clutch control solenoid valve 154 and the first clutch piston and cylinder assembly 160, as well as the components associated with activation of the second clutch 64B, such as the second electric pressure or flow clutch control solenoid valve 204 and the second clutch piston and cylinder assembly 210, are the same as in the previously described embodiments. The arrangement of components associated with the logic valves and shift actuators in the third embodiment 500 of the hydraulic control system is distinct from the other embodiments.

The first branch 142A of the manifold 142 communicates with the inlet port 144A of the first electric pressure or flow control solenoid valve 144 and the outlet port 144B communicates through the line 146 and the orifice 148 directly to a first port 508A of a cylinder 508 of a first dual area piston and cylinder assembly 510. The first piston and cylinder assembly 510 includes a first piston 512 which is connected to a first shift rail 514 and first shift fork associated with the first synchronizer clutch assembly 82A which engages second or sixth gear. The second branch 142B of the manifold 142 communicates with the inlet port 310A of the third electric pressure or flow control solenoid valve 310 and the outlet port 310B communicates through the orifice 312 and the line 314 directly to a first inlet port 520A of a first spool or logic valve 520. The first inlet port 520A is flanked by a pair of exhaust ports 520D and 520E which communicate with the sump 102. The third branch 142C of the manifold 142 communicates with the inlet port 152A of the first two position solenoid valve 152. The outlet port 152B of the first two position solenoid valve 152 communicates through a line 518 both with a control port 520C at the end of the first spool or logic valve 520 and a second port 528B of a cylinder 528 of a two position second piston and cylinder assembly 530.

The second piston and cylinder assembly 530 includes a second piston 532 which is connected to a second shift rail 534 and shift fork associated with the second synchronizer clutch assembly 82B which, for example, engages fourth gear. The outlet port 152C of the first two position solenoid valve 152 connects to the sump 102. The first logic valve 520 also includes a first outlet port 520G and a second outlet port 520H. The first outlet port 520G communicates through a line 516 to a second port 508B in the first cylinder 508 of the first piston and cylinder assembly 510 and the second outlet port 520H communicates through a line 536 to a first port 528A in the second cylinder 528 of the second piston and cylinder assembly 530.

In a manner similar to the above embodiments, activation or energization of the control valves 144, 152 and 310 controls the flow of pressurized hydraulic fluid to the first spool or logic valve 520 and the two piston and cylinder assemblies 510 and 530 and thus the selection and engagement of a desired gear or gear ratio. Specifically, energization of the first two position solenoid valve 152 determines both the position of the spool of the first spool or logic valve 520 and the flow of pressurized hydraulic fluid in the lines 516 and 536 as well as pressurized flow in the line 518 to the second port 528B in the second piston and cylinder assembly 530. The first pressure or flow control solenoid valve 144 and the third pressure or flow control solenoid valve 310 control the pressure and flow of hydraulic fluid through the lines 146, 516 and 536 to control the positions of the pistons 512 and 532.

Turning now to the portion of the control system associated with the second manifold 192, the first branch 192A of the second manifold 192 communicates with the inlet port 194A of the second electric pressure or flow control solenoid valve 194. The second pressure or flow control solenoid valve 194 includes the outlet port 194B and the exhaust port 194C which communicates with the sump 102. The outlet port 194B is connected through the line 196 having the flow restricting orifice 198 to a first inlet port 550A of a second two position spool or logic valve 550. The fourth pressure or flow control solenoid 320 includes the first inlet port 320A communicating with the second branch 192B of the second manifold 192, the outlet port 320B communicating with the flow restricting orifice 322 in the line 324 which connects to a first inlet port 580A of a third spool or logic valve 580 and the exhaust port 320C which communicates with the sump 102.

The second two position spool or logic valve 550 also includes a second inlet port 550B communicating through a line 552 with a first outlet port 580G of the third logic valve 580, a control port 550C, three exhaust ports 550D, 550E and 550F interleaved with the inlet ports 550A and 550B and four outlet ports 550G, 5560H, 550I and 550J. The third branch 192C of the second manifold 192 communicates with an inlet port 554A of a second two position (on-off) solenoid valve 554. The second two position solenoid valve 554 also includes an outlet port 554B which communicates with the control port 550C of the second two position logic valve 550 and an exhaust port 554C which communicates with the sump 102.

The first outlet port 550G communicates through a line 556 with a first port 558A of a third cylinder 558 of a third piston and cylinder assembly 560. The third piston and cylinder assembly 560 also includes a third dual area piston 562 which is coupled to a third shift rail 564, third shift fork and the third synchronizer clutch assembly 92A which may be associated with, for example, selection of fifth and seventh gears. A second port 558B of the fifth cylinder 558 communicates through a line 565 with the third outlet port 550H of the second two position logic valve 550. The second outlet port 550I communicates through a line 566 with a first port 568A of a fifth cylinder 568 of a fifth piston and cylinder assembly 570. The fifth piston and cylinder assembly 570 also includes a fifth dual area piston 572 which is coupled to a fifth shift rail 574, fifth shift fork and fifth synchronizer clutch assembly 92C which may be associated with, for example, selection of first and reverse gears. A second port 568B in the second cylinder 568 communicates through a line 576 with the fourth outlet port 550J of the second two position logic valve 550.

The third spool or logic valve 580 includes a first exhaust port 580D and a second exhaust port 580E flanking the inlet port 580A, a first control port 580C, a first outlet port 580G and a second outlet port 580H. The third branch 192C of the second manifold 192 communicates with an inlet port 582A of a third two position (on-off) solenoid valve 582. The third two position solenoid valve 582 includes an outlet port 582B and an exhaust port 582C which communicates with the sump 102. The outlet port 582B of the third two position solenoid valve 582 communicates through a line 584 with both the control port 580C of the third logic valve 580 and a second port 588B of a fourth cylinder 588 of a two position fourth piston and cylinder assembly 590. The fourth piston and cylinder assembly 590 includes a fourth piston 592 coupled to a fourth shift rail 594, a fourth shift fork and the fourth synchronizer clutch assembly 92B which is associated with, for example, engagement of third gear. A line 596 connects the second outlet port 580H of the third spool or logic valve 580 with a first port 588A in the fourth cylinder 588.

Figure 5A:
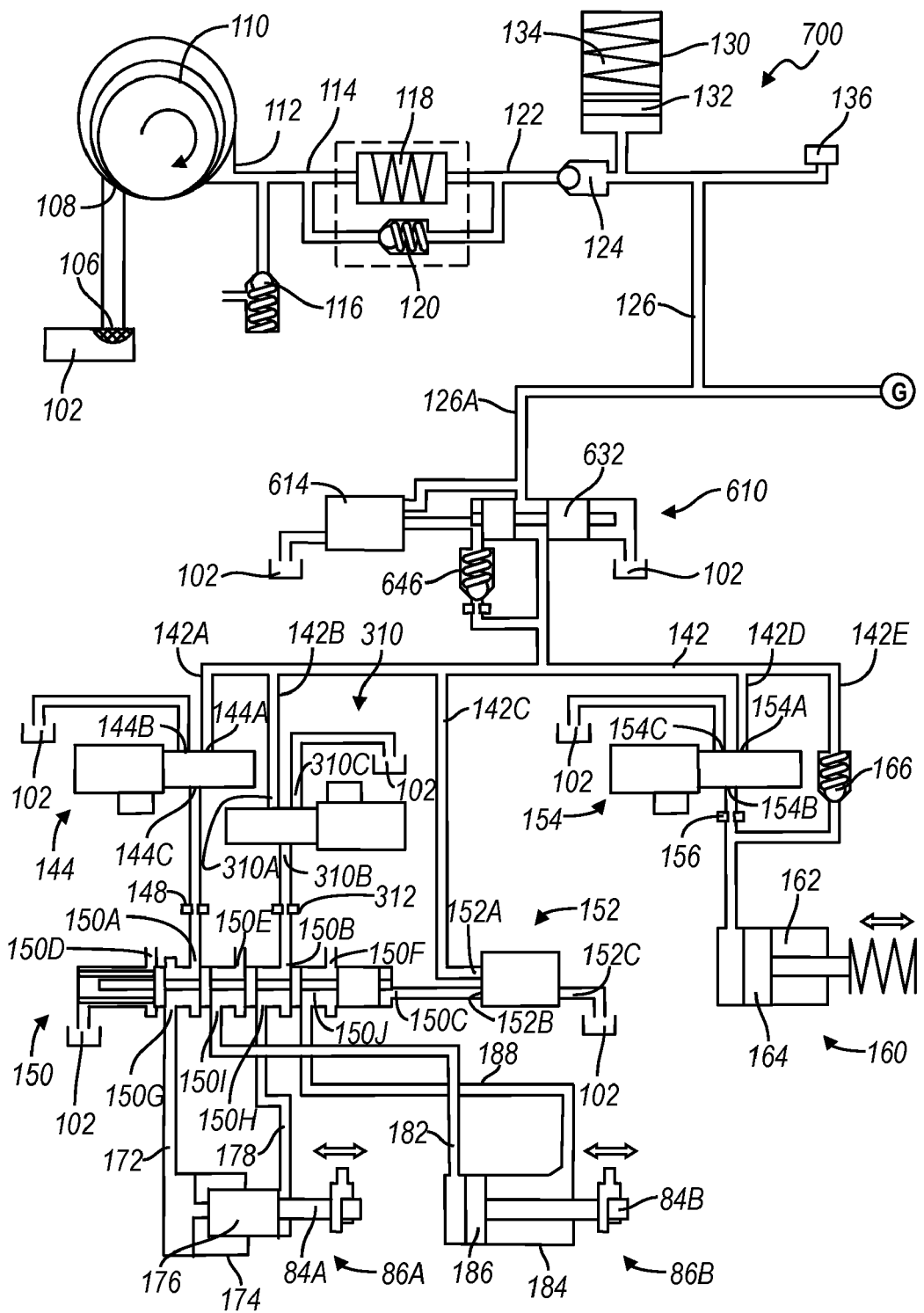
FIGS. 5A and 5B are schematic flow diagrams of a fourth embodiment of a hydraulic control system according to the present invention for a dual clutch automatic transmission.
Figure 5B:
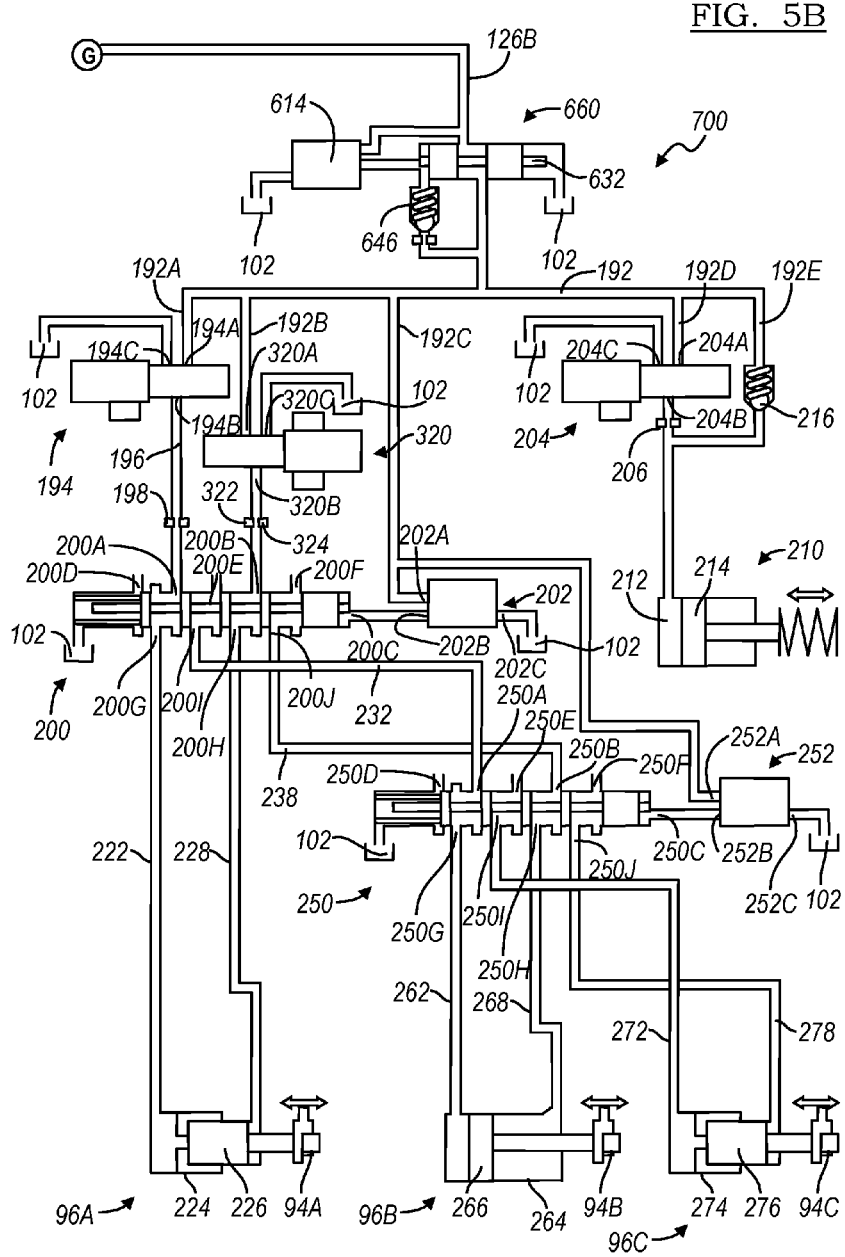

Referring now to FIGS. 1, 5A and 5B, a fourth embodiment of a hydraulic control system according to the present invention is illustrated and generally designated by the reference number 700. The fourth embodiment 700 of the hydraulic control system, as stated above, includes the following components that are in other embodiments: the electric or engine driven pump 110, the filters 106 and 118, the accumulator 130 and the other components of the hydraulic fluid supply and they will thus not be further described.

Furthermore, those components associated with the first branching manifold 142 including the first pressure or flow control solenoid valve 144, the third pressure or flow control solenoid valve 310, the first spool or logic valve 150 and the associated pistons 176 and 186 and cylinders 174 and 184 as well as the components associated with activation of the first clutch 64A, such as the first pressure or flow clutch control solenoid valve 154 and the first clutch piston and cylinder assembly 160 are the same as the first embodiment 300 illustrated in FIGS. 2A and 2B. Similarly, those components associated with the second branching manifold 192 including the second pressure or flow control solenoid valve 194, the fourth pressure or flow control solenoid valve 320, the second spool or logic valve 200, the third spool or logic valve 250, and the associated pistons 226, 266 and 276 the cylinders 224, 264 and 274 as well as the components associated with activation of the second clutch 64B, such as the second pressure or flow clutch control solenoid valve 204 and the second clutch piston and cylinder assembly 210, are also the same as the first embodiment 300 illustrated in FIGS. 2A and 2B.

The fourth embodiment 700 of the hydraulic control system differs from the first embodiment 300 in that the first pressure control solenoid valve 140 and the second pressure control solenoid valve 190 have been replaced with a first feed limit valve assembly 610 and a second feed limit valve assembly 660, respectively. Inasmuch as first and second feed limit valve assemblies 610 and 660 are identical, only the first limit valve assembly 610 will be described.

Figure 6:
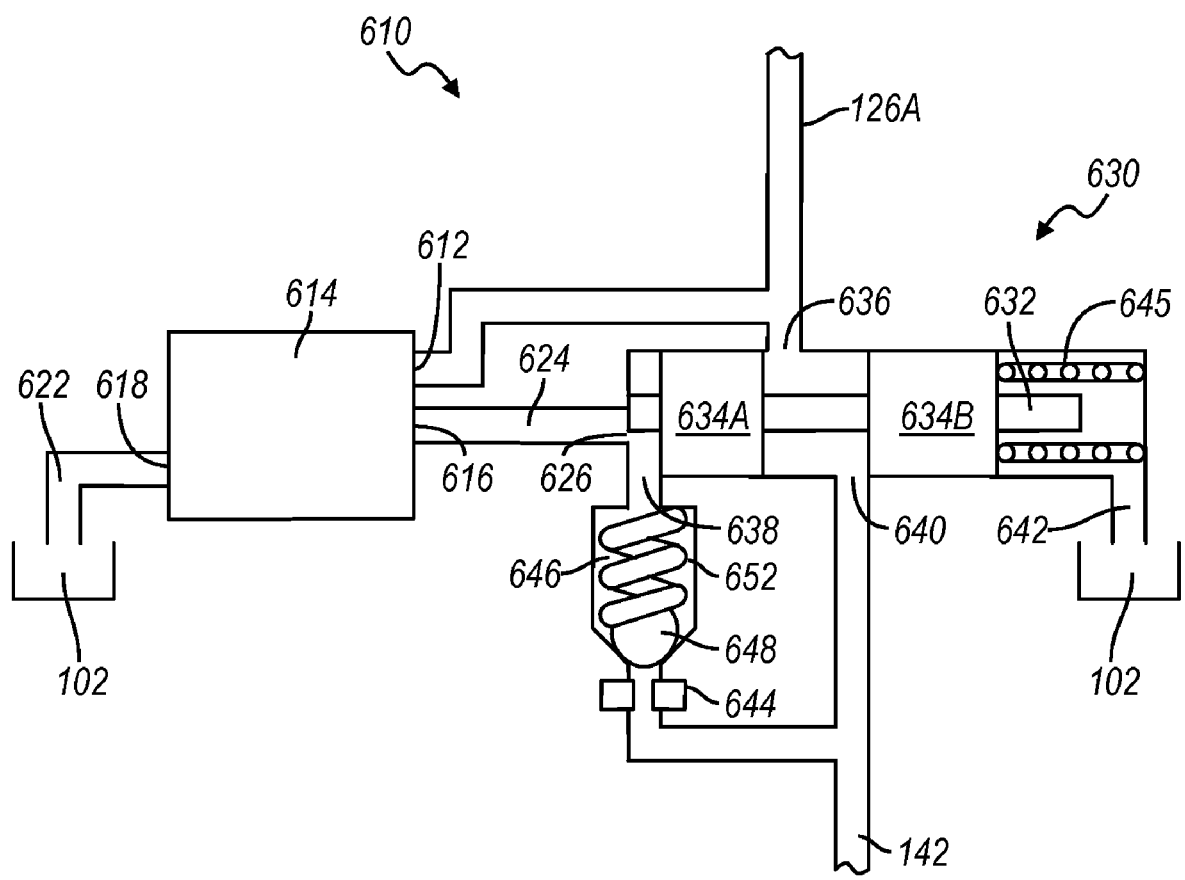
FIG. 6 is an enlarged, diagrammatic view of a feed limit valve with flow cut-off for hydraulic control systems according to the present invention.

Referring now to FIG. 6, the first feed limit valve assembly 610 receives pressurized hydraulic fluid in the first main supply line 126A. The line 126A bifurcates and one branch communicates with an inlet port 612 of a two position (on-off) solenoid valve 614. The solenoid valve 614 includes an outlet port 616 which is in fluid communication with the inlet port 612 when the solenoid valve 614 is energized. The solenoid valve 614 also includes an exhaust port 618 which connects to the sump 102 through a line 622.

When the solenoid valve 614 is de-energized, the outlet port 616 is in fluid communication with the exhaust port 618. The outlet port 616 of the solenoid valve 614 is connected by a line 624 to a control port 626 of a control or spool valve 630. The control or spool valve 630 includes a spool 632 having two spaced-apart lands 634A and 634B. The following ports provide oil around and to the control or spool valve 630: the control port 626, a first inlet port 636 which is connected to the first main supply line 126A, a feedback port 638, an outlet port 640 and an exhaust port 642 which communicates with the sump 102. A compression spring 645 which biases the spool 632 toward the control port 626 is disposed within the control or spool valve 630 proximate the exhaust port 642. The outlet port 640 is connected to and communicates with the first manifold 142 and, through a flow restricting orifice 644, and a check valve 646 having, for example, a check ball 648 and a compression spring 652, with the feedback port 638. The compression spring 652 biases the check ball 648 toward the orifice 644 such fluid flow from the feedback port 638 to the first manifold 142 is prohibited but fluid flow from the first manifold 142 to the feedback port 638 is possible if the pressure differential across the check ball 648 is high enough to overcome the bias of the compression spring 652. Depending upon operational conditions and considerations, the compression spring 652 within the check valve 646 may be omitted without operational degradation.

In operation, the first feed limit valve assembly 610 provides improved flow and pressure control to the other components of the hydraulic control system. In its relaxed state, as illustrated in FIG. 6, flow from the main supply line 126A passes through the control or spool valve 630 between the lands 634A and 634B and out to the first manifold 142. As hydraulic pressure in the system builds as, for example, actuators move and fill, the pressure will increase at the end of the check valve 646, unseating it and hydraulic fluid will flow to the control port 626. This action translates the valve spool 632 to the right, closing off flow to the inlet port 636 or the outlet port 640 (depending on valve design) and the first manifold 126 or 142. Thus, the pressure delivered to the first manifold 142 can be controlled. Additionally, if the side of the transmission 60 associated with the control or spool valve 630 is to be inoperative, for example, while the other side of the transmission 60 is operating, the solenoid valve 614 is energized to provide hydraulic fluid from the first main supply line 126A to the first control port 626 to translate the valve spool 632 to the right to close off fluid flow between the inlet port 636 and the outlet port 640. In this operating mode, the check valve 646 prevents the fluid pressure provided to the control port 626 and the feedback port 638 from being communicated to the first manifold 142 and the other components of the system.

Thus, it will be appreciated that the operation of the fourth embodiment 700 of the hydraulic control system is essentially the same as that of the first embodiment 300 with the addition of the improved pressure and flow control achieved by the feed limit valve assemblies 610 and 660.

Figure 7A:
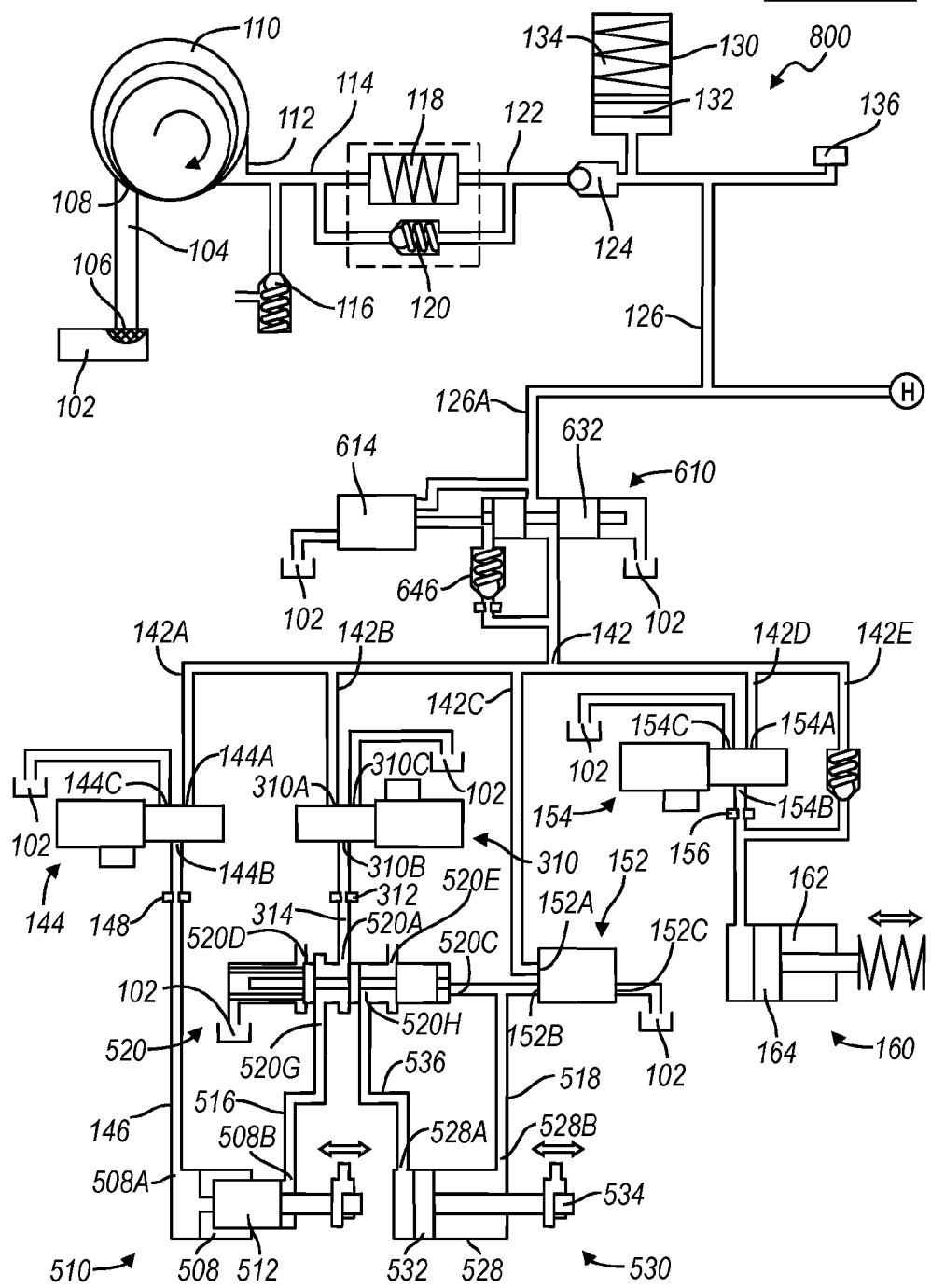
FIGS. 7A and 7B are schematic flow diagrams of an fifth embodiment of a hydraulic control system according to the present invention for a dual clutch automatic transmission.
Figure 7B:
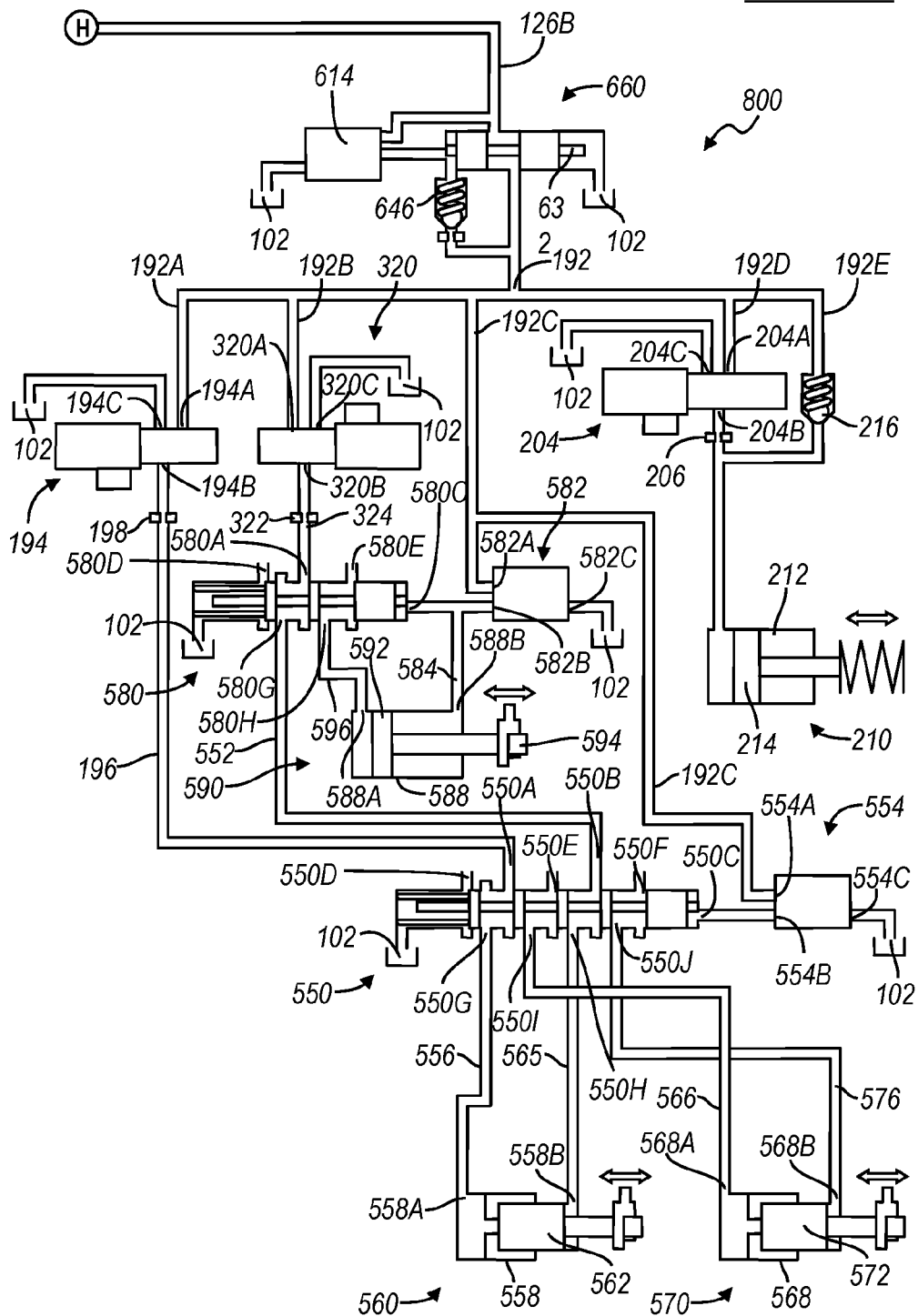

Referring now to FIGS. 1, 7A and 7B, a fifth embodiment of a hydraulic control system according to the present invention is illustrated and generally designated by the reference number 800. The fifth embodiment 800 of the hydraulic control system, as stated above, includes the following components that are in the other embodiments: the electric or engine driven pump 110, the filters 106 and 118, the accumulator 130 and the other components of the hydraulic fluid supply and they will thus not be further described.

Furthermore, those components associated with the first branching manifold 142 including the first pressure or flow control solenoid valve 144, the third pressure or flow control solenoid valve 310, the first spool or logic valve 520 and the associated piston and cylinder assemblies 510 and 530 as well as the components associated with activation of the first clutch 64A, such as the first pressure or flow clutch control solenoid valve 154 and the first clutch piston and cylinder assembly 160 are the same as the third embodiment 500 illustrated in FIGS. 4A and 4B. Similarly, those components associated with the second branching manifold 192 including the second pressure or flow control solenoid valve 194, the fourth pressure or flow control solenoid valve 320, the second spool or logic valve 550, the third spool or logic valve 580 and the associated piston and cylinder assemblies 560, 570 and 590 as well as the components associated with activation of the second clutch 64B, such as the second pressure or flow clutch control solenoid valve 204 and the second clutch piston and cylinder assembly 210, are also the same as the third embodiment 500 illustrated in FIGS. 4A and 4B.

The fifth embodiment 800 of the hydraulic control system differs from the third embodiment 500 in that the first pressure control solenoid valve 140 and the second pressure control solenoid valve 190 have been replaced with the first feed limit valve assembly 610 and the second feed limit valve assembly 660, respectively, illustrated in FIG. 6. The above description of the components and operation of the first feed limit valve assembly 610 appearing in paragraphs through which also applies to the second feed limit valve assembly 660 is herein incorporated by reference. Thus, it will be appreciated that the operation of the fifth embodiment 800 of the hydraulic control system is essentially the same as that of the third embodiment 500 with the addition of the feed limit valve assemblies 610 and 660 which improve pressure and flow control.

Figure 8A:
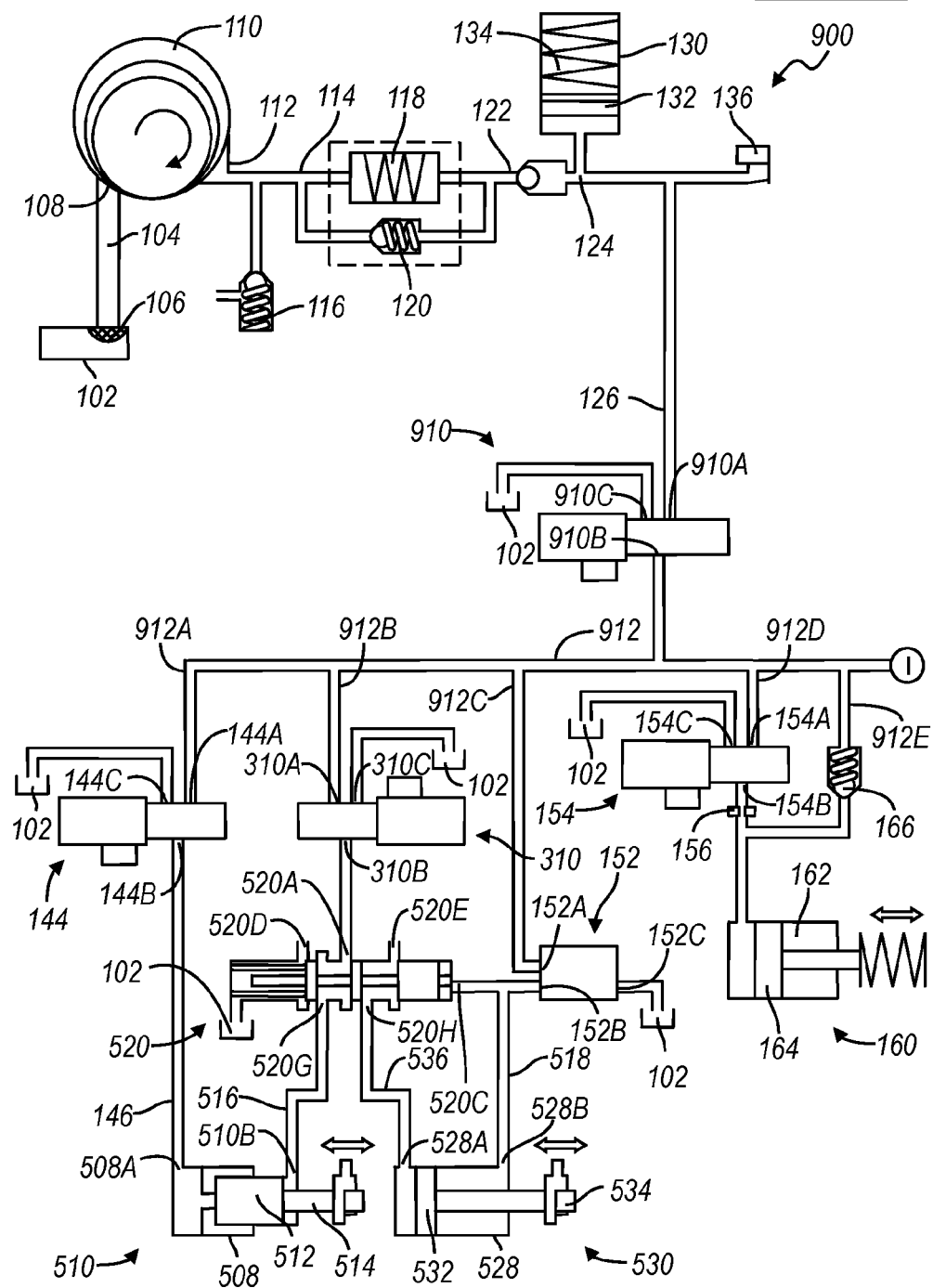
FIGS. 8A and 8B are schematic flow diagrams of a sixth embodiment of a hydraulic control system according to the present invention for a dual clutch automatic transmission.
Figure 8B:
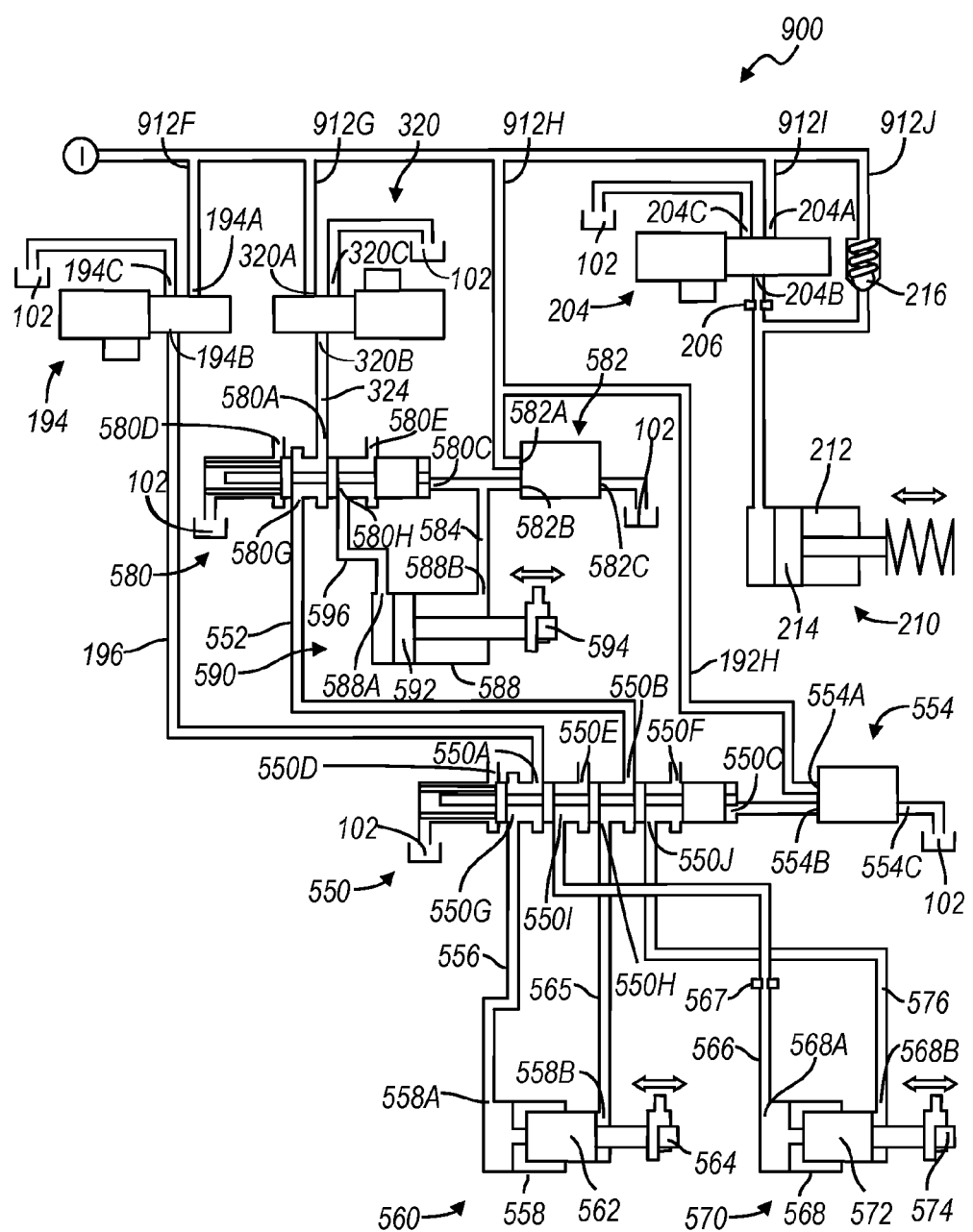

Referring now to FIGS. 1, 8A and 8B, a sixth embodiment of a hydraulic control system according to the present invention is illustrated and generally designated by the reference number 900. The sixth embodiment 900 of the hydraulic control system, as stated above, includes the following components of the other embodiments: the electric or engine driven pump 110, the filters 106 and 118, the accumulator 130 and the other components of the hydraulic fluid supply and thus they will not be further described.

Additionally, the hydraulic components associated with both sides of the transmission 60 are the same as the third embodiment 500 illustrated in FIGS. 4A and 4B and the fifth embodiment 800 illustrated in FIGS. 7A and 7B. Specifically, the first pressure or flow control solenoid valve 144, the third pressure or flow control solenoid valve 310, the first spool or logic valve 520 and the associated piston and cylinder assemblies 510 and 530 as well as the components associated with activation of the first clutch 64A, such as the first pressure or flow clutch control solenoid valve 154 and the first clutch piston and cylinder assembly 160 are the same as the third embodiment 500 and the fifth embodiment 800. Similarly, the second pressure or flow control solenoid valve 194, the fourth pressure or flow control solenoid valve 320, the second spool or logic valve 550, the third spool or logic valve 580 and the associated piston and cylinder assemblies 560, 570 and 590, with the addition of a flow restricting orifice 567 in the line 566, as well as the components associated with activation of the second clutch 64B, such as the second pressure or flow clutch control solenoid valve 204 and the second clutch piston and cylinder assembly 210, are the same as the third embodiment 500 and the fifth embodiment 800.

The differences between the third and fifth embodiments 500 and 800 and the sixth embodiment 900 relate to the components supplying hydraulic fluid to the system and to the configuration of the manifold. The main supply line 126 communicates with an inlet port 910A of a pressure control solenoid valve 910. The pressure control solenoid valve 910 includes an outlet port 910B which communicates with a manifold 912 and an exhaust port 910C. When the pressure control solenoid valve 910 is energized, the inlet port 910A communicates with the outlet port 910B. When the pressure control solenoid valve 910 is de-energized, the inlet port 910A is closed off and the outlet port 910B communicates with the exhaust port 910C, allowing hydraulic fluid to flow to the sump 102.

The manifold 912 includes a plurality of branches which provide pressurized hydraulic fluid to the various components of the hydraulic control system 900 recited above. Thus, a first branch 912A provides hydraulic fluid to the inlet port 144A of the first pressure or flow control solenoid valve 144, a second branch 912B provides hydraulic fluid to the inlet port 310A of the third pressure or flow control solenoid valve 310, a third branch 912C provides hydraulic fluid to the inlet port 152A of the first two position solenoid valve 152, a fourth branch 912D provides hydraulic fluid to the inlet port 154A of the first clutch control solenoid valve 154, a fifth branch 912E provides a communication path to the first pressure limit control valve 166, a sixth branch 912F provides hydraulic fluid to the inlet port 194A of the second pressure or flow control solenoid valve 194, a seventh branch 912G provides hydraulic fluid to the inlet port 320A of the fourth pressure or flow control solenoid valve 330, an eighth branch 912H provides hydraulic fluid to the inlet port 582A of the third two position solenoid valve 582 and to the inlet port 554A of the second two position solenoid valve 554, a ninth branch 912I provides hydraulic fluid to an inlet port 204A of the second clutch control solenoid valve 204 and a tenth branch 912J provides a communication path to the second pressure limit control valve 216.

It will be appreciated that the hydraulic control systems according to various embodiments of the present invention achieve significant improvements in reduced energy consumption and shift performance not only because of the incorporation of the dedicated electric pump and accumulator but also because of the use of pressure and flow control solenoid valves which allow the majority of the hydraulic system components to be turned off in normal, steady-state, operation. Additionally, these solenoid valves and the linear position sensors on each piston and cylinder shift actuator assembly which provide real time data to the transmission control module regarding the instantaneous positions of the actuators, shift rails and clutches, achieve gear selection and clutch operation that is rapid, positive and efficient without overshoot and wasted energy.

Similarly, the configurations of the various embodiments and the position feedback provided by the linear position sensors permits and facilitates rapid gear sequencing and improved, i.e., reduced, shift times.

Finally, the separation of hydraulic fluid supply and control functions into two regions or sections corresponding to the odd and even gear selecting portions of the transmissions, reduces the likelihood of inaccurate or multiple gear selection and further improves efficiency by permitting shutting down the non-active region or section of the transmission during certain operating situations such as extended operation in the highest gear.

The description of the invention is merely exemplary in nature and variations that do not depart from the gist of the invention are intended to be within the scope of the invention. Such variations are not to be regarded as a departure from the spirit and scope of the invention.

What is claimed is:

1. A hydraulic control system for a dual clutch transmission comprising, in combination, a source of pressurized hydraulic fluid having a pump, a first pressure control solenoid valve having an inlet communicating with said source of hydraulic fluid and a first outlet, a second pressure control solenoid valve having an inlet communicating with said source of hydraulic fluid and a second outlet, a first clutch actuator assembly in fluid communication with said first outlet and including a first piston and cylinder assembly and a first solenoid valve for selectively supplying hydraulic fluid to said first piston and cylinder assembly, a second clutch actuator assembly in fluid communication with said second outlet and including a second piston and cylinder assembly and a second solenoid valve for selectively supplying hydraulic fluid to said second piston and cylinder assembly, a first pressure or flow control solenoid valve having an inlet connected to said first outlet and having a third outlet, a second pressure or flow control solenoid valve having an inlet connected to said first outlet and having a fourth outlet, a first logic valve having a first inlet connected to said third outlet and a second inlet connected to said fourth outlet, a plurality of exhaust ports, a control port, a first outlet, a second outlet, a third outlet and a fourth outlet, a first gear selection piston and cylinder assembly having a first port connected to said first outlet of said first logic valve and a second port connected to said to said third outlet of said first logic valve, a second gear selection piston and cylinder assembly having a first port connected to said second outlet of said first logic valve and a second port connected to said to said fourth outlet of said first logic valve, a third pressure or flow control solenoid valve having an inlet connected to said second outlet and having a fifth outlet, a fourth pressure or flow control solenoid valve having an inlet connected to said second outlet and having a sixth outlet, a second logic valve having a first inlet connected to said fifth outlet, a second inlet connected to said sixth outlet, a plurality of exhaust ports, a control port, a first outlet, a second outlet, a third outlet and a fourth outlet, a third gear selection piston and cylinder assembly having a first port connected to said first outlet of said second logic valve and a second port connected to said to said third outlet of said second logic valve, a third logic valve having a first inlet connected to said second outlet of said second logic valve and a second inlet connected to said fourth outlet of said second logic valve, a plurality of exhaust ports, a control port, a first outlet, a second outlet, a third outlet and a fourth outlet, a fourth gear selection piston and cylinder assembly having a first port connected to said first outlet of said third logic valve and a second port connected to said third outlet of said third logic valve, and a fifth gear selection piston and cylinder assembly having a first port connected to said second outlet of said third logic valve and a second port connected to said to said fourth outlet of said third logic valve.

2. The hydraulic control system of claim 1 further including a spool in each of said logic valves and means for translating said spool between a first position and a second position.

3. The hydraulic control system of claim 1 wherein said means for translating said spools is a two position solenoid valve having a fluid output directed to said spool.

4. The hydraulic control system of claim 1 wherein said means for translating said spools is a solenoid pendal acting on said spool.

5. The hydraulic control system of claim 1 further including a linear position sensor operably associated with each of said gear selection piston and cylinder assemblies.

6. The hydraulic control system of claim 1 further including a transmission control module having a plurality of inputs and outputs, said outputs operably coupled to said valves and a linear position sensor for sensing the output of each of said gear selection piston and cylinder assemblies and having an output coupled to one of said control module inputs.

7. The hydraulic control system of claim 1 further including a first two position solenoid valve having an input communicating with said first outlet of said first pressure control solenoid valve and an outlet communicating with said control port of said first logic valve, a second two position solenoid valve having an input communicating with said second outlet of said second pressure control solenoid valve and an outlet communicating with said control port of said second logic valve and a third two position solenoid valve having an input communicating with said second outlet of said second pressure control solenoid valve and an outlet communicating with said control port of said third logic valve.

8. The hydraulic control system of claim 1 wherein said gear selection piston and cylinder assemblies are configured to provide three positive positions.

9. A hydraulic control system for a dual clutch transmission comprising, in combination,
a source of pressurized hydraulic fluid including a pump,
first and second means in fluid communication with said source of pressurized fluid for providing first and second pressure regulated outputs,
a pair of clutch actuator assemblies each in fluid communication with one of said outputs and including a piston and cylinder assembly and a solenoid valve for selectively supplying hydraulic fluid to said piston and cylinder assembly,
a first pressure or flow control solenoid valve having an inlet connected to said first output and having an outlet,
a second pressure or flow control solenoid valve having an inlet connected to said first output and having an outlet,
a first logic valve having a first inlet connected to said outlet of said first pressure or flow control solenoid valve and a second inlet connected to said outlet of said second pressure or flow control solenoid valve, a plurality of exhaust ports, a control port, a first outlet, a second outlet, a third outlet and a fourth outlet,
a first gear selection piston and cylinder assembly having a first port connected to said first outlet of said first logic valve and a second port connected to said to said third outlet of said first logic valve,
a second gear selection piston and cylinder assembly having a first port connected to said second outlet of said first logic valve and a second port connected to said to said fourth outlet of said first logic valve,
a third pressure or flow control solenoid valve having an inlet connected to said second output and having an outlet,
a fourth pressure or flow control solenoid valve having an inlet connected to said second output and having an outlet,
a second logic valve having a first inlet connected to said outlet of said third pressure or flow control solenoid valve, a second inlet connected to said outlet of said fourth pressure or flow control solenoid valve, a plurality of exhaust ports, a control port, a first outlet, a second outlet, a third outlet and a fourth outlet,
a third gear selection piston and cylinder assembly having a first port connected to said first outlet of said second logic valve and a second port connected to said to said third outlet of said second logic valve,
a third logic valve having a first inlet connected to said second outlet of said second logic valve and a second inlet connected to said fourth outlet of said second logic valve, a plurality of exhaust ports, a control port, a first outlet, a second outlet, a third outlet and a fourth outlet,
a fourth gear selection piston and cylinder assembly having a first port connected to said first outlet of said third logic valve and a second port connected to said third outlet of said third logic valve, and
a fifth gear selection piston and cylinder assembly having a first port connected to said second outlet of said third logic valve and a second port connected to said to said fourth outlet of said third logic valve.

10. The hydraulic control system for a dual clutch transmission of claim 9 wherein said means for providing first and second pressure regulated outputs is a pair of pressure control solenoid valves.

11. The hydraulic control system for a dual clutch transmission of claim 9 further including a linear position sensor operably associated with said piston of each of said piston and cylinder assemblies and a transmission control module having inputs for receiving data from said sensors.

12. The hydraulic control system for a dual clutch transmission of claim 9 further including a first two position solenoid valve having an input communicating with said first pressure regulated output and an outlet communicating with said control port of said first logic valve, a second two position solenoid valve having an input communicating with said second pressure regulated output and an outlet communicating with said control port of said second logic valve and a third two position solenoid valve having an input communicating with said second pressure regulated output and an outlet communicating with said control port of said third logic valve.

* * * * *